US008532118B2

(12) United States Patent
Naruse

(10) Patent No.: US 8,532,118 B2
(45) Date of Patent: Sep. 10, 2013

(54) COMMUNICATION TECHNIQUE IN NETWORK INCLUDING LAYERED RELAY APPARATUSES

(75) Inventor: Akira Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 13/204,825

(22) Filed: Aug. 8, 2011

(65) Prior Publication Data

US 2012/0106556 A1 May 3, 2012

(30) Foreign Application Priority Data

Nov. 1, 2010 (JP) ................................ 2010-245469

(51) Int. Cl.
*H04L 12/28* (2006.01)
(52) U.S. Cl.
USPC .......................................... 370/400; 370/389
(58) Field of Classification Search
USPC ................. 370/235, 252, 253, 255, 256, 257, 370/258, 389, 392, 400–406
See application file for complete search history.

(56) References Cited

U.S. PATENT DOCUMENTS 8,160,063 B2 * 4/2012 Maltz et al. ................... 370/389
2009/0016332 A1 * 1/2009 Aoki et al. .................... 370/388

FOREIGN PATENT DOCUMENTS

JP  11-150533 A  6/1999

OTHER PUBLICATIONS

A Multiple LID Routing Scheme for Fat-Tree-Based InfiniBand Networks by Xuan-Yo Lin, Yeh-Ching Chung, and Tai-Yi Huang.*

Faraj, Ahmad et al., "Automatic Generation and Tuning of MPI Collective Communication Routines", In Proceedings of the 19th Annual international Conference on Supercomputing (SC05); Jun. 22, 2005.
Geoffray, Patrick et al., "Adaptive Routing Strategies for Modern High Performance Networks", In Proceedings of the 16th IEEE Symposium on High Performance Interconnects; Aug. 28, 2008.
Gomez, C. et al., "Deterministic versus Adaptive Routing in Fat-Trees", In Proceedings of the 2007 IEEE International Parallel and Distributed Processing Symposium (IPDPS07); Mar. 30, 2007.
Hoefler, Torsten et al., "Multistage Switches are not Crossbars: Effects of Static Routing in High-Performance Networks", In Proceedings of the 2008 IEEE International Conference on Cluster Computing (Cluster08); Oct. 1, 2008.
Lin, Xuan-Yi et al., "A Multiple LID Routing Scheme for Fat-Tree-Based InfiniBand Networks", In Proceedings of the 18th IEEE International Parallel and Distributed Processing Symposium; Apr. 30, 2004.

(Continued)

*Primary Examiner* — Anh-Vu Ly
*Assistant Examiner* — Hashim Bhatti
(74) *Attorney, Agent, or Firm* — Fujitsu Patent Center

(57) ABSTRACT

This method includes: obtaining first data including identifiers of selected computers for invocation of parallel processes among plural computers connected to lowest-layer relay apparatuses in a network including relay apparatuses in plural layers, wherein the network includes paths between a relay apparatus in a first layer and plural relay apparatuses in a second layer that is an immediately upper layer than the first layer; and selecting, for each of the selected computers and from network identifiers for respective communication routes, network identifiers to be used for communication with other selected computers so as to avoid coincidence of communication routes between the selected computers for which a same difference value is calculated between identification numbers, wherein the network identifiers are associated in advance with an identifier of each of the plural computers and are used for routing in the network, and the identification numbers are assigned for ordering the selected computers.

10 Claims, 43 Drawing Sheets

(56) References Cited

OTHER PUBLICATIONS

Naruse, Akira et al., "Performance Evaluation of All-to-all Communication on PC Cluster Systems with Multi-Stage InfiniBand Networks", IPSJ SIG Technical Reports, Information Processing Society of Japan, 2010-HPC-126(16); Jul. 27, 2010, (English Abstract).

Vishnu, A. et al., "Hot-Spot Avoidance With Multi-Pathing Over InfiniBand: An MPI Perspective", In Proceedings of the 7th IEEE International Symposium on Cluster Computing and the Grid; May 17, 2007.

Zahavi, Eitan et al., "Optimized InfiniBand fat-tree routing for shift all-to-all communication patterns", Concurrency and Computation: Practice and Experience, John Wiley & Sons, Ltd.; 2009.

* cited by examiner

FIG.17C

| LOWER-LAYER SW | LOCAL COMPUTER NO. OF TRANSMISSION SOURCE | SHIFT DISTANCE | | | | | | | |
|---|---|---|---|---|---|---|---|---|---|
| | | 0 | 1 | 2 | 3 | 4 | 5 | 6 | 7 |
| x | 0 | | | | 3y | 4y | 5y | 6z | 7z |
| x | 1 | | | 3y | 4y | 5y | 6z | 7z | |
| x | 2 | | 3y | 4y | 5y | 6z | 7z | | |
| y | 3 | | | | 6z | 7z | 0x | 1x | 2x |
| y | 4 | | | 6z | 7z | 0x | 1x | 2x | |
| y | 5 | | 6z | 7z | 0x | 1x | 2x | | |
| z | 6 | | | 0x | 1x | 2x | 3y | 4y | 5y |
| z | 7 | | 0x | 1x | 2x | 3y | 4y | 5y | |

FIG.17D

| LOWER-LAYER SW | LOCAL COMPUTER NO. OF TRANSMISSION SOURCE | SHIFT DISTANCE | | | | | | | |
|---|---|---|---|---|---|---|---|---|---|
| | | 0 | 1 | 2 | 3 | 4 | 5 | 6 | 7 |
| x | 0 | | | | 3yA | 4yA | 5yA | 6zA | 7zA |
| x | 1 | | | 3yA | 4yB | 5yB | 6zB | 7zB | |
| x | 2 | | 3yA | 4yB | 5yC | 6zC | 7zC | | |
| y | 3 | | | | 6zA | 7zA | 0xA | 1xC | 2xB |
| y | 4 | | | 6zC | 7zB | 0xB | 1xB | 2xA | |
| y | 5 | | 6zB | 7zA | 0xC | 1xC | 2xC | | |
| z | 6 | | | 0xB | 1xA | 2xA | 3yA | 4yB | 5yC |
| z | 7 | | 0xC | 1xC | 2xB | 3yB | 4yB | 5yC | |

FIG. 17E

| LOWER-LAYER SW | LOCAL COMPUTER NO. OF TRANSMISSION SOURCE | SHIFT DISTANCE |   |   |   |   |   |   |   |
|---|---|---|---|---|---|---|---|---|---|
|   |   | 0 | 1 | 2 | 3 | 4 | 5 | 6 | 7 |
| x | 0 |   |   |   | 3yA | 4yA | 5yA | 6zA | 7zA |
| x | 1 |   |   | 3yA | 4yB | 5yB | 6zB | 7zB |   |
| x | 2 |   | 3yA | 4yB | 5yC | 6zC | 7zC |   |   |
| y | 3 |   |   |   | 6zA | 7zA | 0xA | 1xC | 2xB |
| y | 4 |   |   | 6zC | 7zB | 0xB | 1xB | 2xA |   |
| y | 5 |   | 6zB | 7zA | 0xC | 1xC | 2xC |   |   |
| z | 6 |   | 0xC | 0xB | 1xA | 2xA | 3yC | 4yB | 5yC |
| z | 7 |   |   | 1xC | 2xB | 3yC | 4yB | 5yC |   |

FIG. 17F

| ID | SHIFT DISTANCE |   |   |   |   |   |   |   |
|---|---|---|---|---|---|---|---|---|
|   | 0 | 1 | 2 | 3 | 4 | 5 | 6 | 7 |
| 3 |   | 20 | 24 | 52(A) | 56(A) | 60(A) | 44(A) | 48(A) |
| 4 |   | 25 | 52(A) | 57(B) | 61(B) | 45(B) | 49(B) | 17 |
| 5 |   | 52(A) | 57(B) | 62(C) | 46(C) | 50(C) | 18 | 22 |
| 12 |   | 58 | 62 | 44(A) | 48(A) | 16(A) | 22(C) | 25(B) |
| 13 |   | 56 | 46(C) | 49(B) | 17(B) | 21(B) | 24(A) | 52 |
| 14 |   | 45(B) | 48(A) | 18(C) | 22(C) | 26(C) | 53 | 61 |
| 10 |   | 49 | 17(B) | 20(A) | 24(A) | 54(C) | 57(B) | 62(C) |
| 11 |   | 18(C) | 22(C) | 25(B) | 54(C) | 57(B) | 62(C) | 46 | proc 0 : comp 03 : 18
proc 1 : comp 04 : 22
proc 2 : comp 05 : --
proc 3 : comp 10 : 46(C)
proc 4 : comp 11 : 50(C)
proc 5 : comp 12 : 52(A)
proc 6 : comp 13 : 57(B)
proc 7 : comp 14 : 62(C)

FIG.17G

Hostfile comp 03
comp 04
comp 05
comp 10
comp 11
comp 12
comp 13
comp 14

COMMUNICATION TECHNIQUE IN NETWORK INCLUDING LAYERED RELAY APPARATUSES

CROSS-REFERENCE TO RELATED APPLICATIONS

This application is based upon and claims the benefit of priority of the prior Japanese Patent Application No. 2010-245469, filed on Nov. 1, 2010, the entire contents of which are incorporated herein by reference.

FIELD

This technique relates to a communication control technique in a network having plural relay apparatuses that are layered.

BACKGROUND

Recently, clusters are constructed by connecting plural computers by a high-speed network or the like to realize a High Performance Computing (HPC). When a parallel processing program is executed in this cluster system, parallel processes are distributedly invoked on plural computers. Therefore, when data exchange is carried out between the parallel processes, the communication is carried out between the computers. Then, the performance of the communication between the computers influences to the performance of the cluster system.

In order to enhance the performance of the communication between the computers, the influence of a high-performance network such as InfiniBand, Myrinet or the like and communication libraries that utilize this high-performance network is considered. On the cluster system, parallel processing programs that are described by the communication Application Program Interface (API) called Message Passing Interface (MPI) are often executed. Therefore, various communication libraries based on the MPI specification are provided.

For example, as illustrated in FIG. 1, when processes 0 to N−1 are distributedly invoked on N computers, the interprocess communication for the data exchange is often carried out during a period between calculation processing defined in the parallel processing program. In FIG. 1, an example is depicted that the communication among all of the processes that were invoked is carried out. However, there is a case where peer-to-peer communication between specific processes is carried out. In this interprocess communication, a corresponding subroutine of the MPI libraries is invoked to conduct the communication.

The pattern of the interprocess communication in the parallel processing program depends on programs and is various. Among the various communication patterns, All-to-All that is a communication pattern in which the data exchange among all of the parallel processes that were invoked as illustrated in FIG. 1 is one of the communication patterns to which attention is paid. Then, it is requested also in the MPI specification that All-to-All communication is realized by a subroutine MPI_Alltoall ( ). Although various algorithms for realizing the All-to-All communication exist, a Ring algorithm is frequently utilized when the data size of the communication data is relatively large and the performance is limited by the bandwidth of the network.

The Ring algorithm will be explained by using FIGS. 2A to 2H. As illustrated in FIG. 2A, a case is considered that 8 processes, namely, processes 0 to 7, are invoked. In such a case, as illustrated in FIG. 2B, first, each process receives data from a process having the process number calculated by subtracting 1 from the process number of the corresponding process. Incidentally, in such a case, a process after the process having the process number "7" is a process having the process number "0", and a process before the process having the process number "0" is a process having the process number "7".

Then, as illustrated in FIG. 2C, each process receives data from a process having the process number calculated by subtracting 2 from the process number of the corresponding process. Furthermore, as illustrated in FIG. 2D, each process receives data from a process having the process number calculated by subtracting 3 from the process number of the corresponding process. Moreover, as illustrated in FIG. 2E, each process receives data from a process having the process number calculated by subtracting 4 from the process number of the corresponding process. In addition, as illustrated in FIG. 2F, each process receives data from a process having the process number calculated by subtracting 5 from the process number of the corresponding process. Moreover, as illustrated in FIG. 2G, each process receives data from a process having the process number calculated by subtracting 6 from the process number of the corresponding process. Furthermore, as illustrated in FIG. 2H, each process receives data from a process having the process number calculated by subtracting 7 from the process number of the corresponding process.

When the Ring algorithm is employed, All-to-All communication is efficiently carried out unless a network configuration having a problem as will be described in the following is employed.

Next, the network configuration is considered. As illustrated in FIG. 3, when several computers are used, these computers can be connected by one network switch SW (hereinafter, simply referred to switch). In other words, 8 computers are connected with one switch, and one process is invoked on each of the computers. In such a case, this network configuration is equivalent to the crossbar connection, and even when the All-to-All communication is conducted between the processes that are invoked, no conflict occurs at the network links.

On the other hand, when the number of computers that are used exceeds the number of the computers to which one switch can connect, a multi-stage network configuration that the switches are arranged in two or more stages is employed. A network configuration in a simple multi-stage switch configuration is a tree network as illustrated in FIG. 4. In FIG. 4, for convenience of explanation, the number of computers and the number of processes that are invoked are the same as those in FIG. 3. However, it is assumed that the number of ports of the switch SW is less than 8. In addition, FIG. 4 illustrates a communication state when the processes 0 to 3 transmit data in case of FIG. 2E. Because the number of switches in the upper-layer of the two-stage switch configuration is limited to "1", which is the minimum, the bandwidth of the links between the upper-layer switch and the lower-layer-switch is insufficient. Therefore, when the All-to-All communication is conducted among 8 processes, the conflicts occurs at the links between the upper-layer switch and the lower-layer switch as illustrated in FIG. 4 by circles, the throughput is lowered.

Therefore, when the network performance is emphasized, a Fat-tree is often employed. In an example of FIG. 5, the number of upper-layer switches is increased to "3", and the number of links from the lower-layer switch to the upper-layer switch (also called uplinks) is identical to the number of links from the lower-layer switch to the computer (also called downlinks). Incidentally, simple squares connected to the lower-layer switch in FIG. 5 represent the computers, and the number within parentheses in the squares represents identifiers of the computers. Moreover, circles represent processes, and the number within the circle represents a process identifier. FIG. 5 represents a state that the processes "0" to "8" are respectively invoked on the computers "3" to "11". Furthermore, in the state of FIG. 5, an upper-layer switch having the number represented under the square of the computer is allocated to each computer. For example, the upper-layer switch 0 is allocated to the computer 3 in which the process 0 is invoked, and when data is transmitted to the computer 3, the data reaches the computer 3 through the upper-layer switch 0. In addition, the upper-layer switch 2 is allocated to the computer 17, and when data is transmitted to the computer 17, the data reaches the computer 17 through the upper-layer switch 2.

Then, a case is considered that three processes 0 to 2 respectively transmit data to processes 3 to 5, which are respectively identified by adding "3" to its own process number. In such a case, data transmission is carried out from the process 0 through the upper-layer switch 0, which is allocated to the process 3, data transmission is carried out from the process 1 through the upper-layer switch 1, which is allocated to the process 4, and data transmission is carried out from the process 2 through the upper-layer switch 2, which is allocated to the process 5. Thus, no link conflict occurs.

However, in the network such as the aforementioned InfiniBand, in which the packet transfer route cannot be dynamically changed (in other words, static routing network), the communication may be concentrated to a specific link between the upper-layer switch and the lower-layer switch. FIG. 6 represents an example of the concentration of the communication. In an example of FIG. 6, 16 computers are connected with a Fat-tree network including 4 upper-layer switches and 4 lower-layer switches. Generally, in the HPC system, computers to be used are selected according to operational states of the respective computers, and processes are invoked on these selected computers. However, depending on a combination of the selected computers, there is possibility that the deviation of the upper-layer switch through which packets to be transmitted to each of the selected computers pass occurs.

In an example of FIG. 6, settings of data transmission to the computers on which the processes "0", "4", "6" and "7" were invoked are made so as to pass through the upper-layer switch "0". Settings of data transmission to the computers on which the processes "1" and "5" were invoked are made so as to pass through the upper-layer switch "1". A setting of data transmission to the computer on which the process "2" was invoked is made so as to pass through the upper-layer switch "2". A setting of data transmission to the computer on which the process "3" was invoked is made so as to pass through the upper-layer switch "3". Then, in case where the computers on which the processes "0" to "3" are invoked as illustrated in FIG. 2E transmit data, an uplink to the upper-layer switch "0" is used for the communication other than data transmission to the computer on which the process "5" was invoked from the computer on which the process "1" was invoked. Therefore, as illustrated by the circle in FIG. 6, the link conflict occurs.

Thus, even when the Fat-tree network is employed, a state may occur that the communication load is concentrated to a specific link, and the communication performance is lowered. This may occur when the static routing network such as InfiniBand is employed. In other words, a problem appears when only one network identifier (called LID in InfiniBand) used for routing in the network is allocated to one computer, and the association between this network identifier and the packet transfer destination port is fixed in each switch. Specifically, as illustrated in the lowest portion of FIG. 6, the LID of the most left computer is "1", and the packet addressed to this computer fixedly passes through the upper-layer switch "0". Similarly, the LID of the most right computer is "16", and the packet addressed to this computer fixedly passes through the upper-layer switch "3".

Furthermore, as described above, the selection of the computer on which the parallel process is invoked is carried out regardless of taking into account the relation between LID and the route setting. Therefore, the deviation of the communication route at the data transmission (here, the upper-layer switch through which packets pass) may occur.

Incidentally, the All-to-All communication was explained as an example that the link conflict easily occurs. However, when the computers as illustrated in FIG. 6 are selected and the processes are invoked, the data communication, which passes through the upper-layer switch "0", easily occurs in other cases (e.g. when peer-to-peer communication is simultaneously carried out between plural combinations of the processes), and the possibility that the link conflict occurs increases as a result.

In order to solve such a problem, a method is proposed that plural LIDs associated to the respective upper-layer switches are allocated to the respective computers, and an LID is selected so that the upper-layer switch is not duplicately allocated among the computers in which the parallel processes are invoked. FIG. 7 illustrates an example.

In FIG. 7, a Fat-tree network including 3 upper-layer switches and 6 lower-layer switches is represented, and 18 computers in total are connected to the lower-layer switches 0 to 5. Here, an LID for a communication route passing through the upper-layer switch A, LID for a communication route passing through the upper-layer switch B and LID for a communication route passing through the upper-layer switch C are allocated to each of the computers. In the lower portion of FIG. 7, for example, as for the computer "0", an LID "4" for the communication route passing through the upper-layer switch A ("A" is illustrated in the parentheses), LID "5" for the communication route passing through the upper-layer switch B and LID "6" for the communication route passing through the upper-layer switch C are allocated. Similarly, as for the computer "10" (which is a computer disposed at the left of the computer "11"), an LID "44" for the communication route passing through the upper-layer switch A, LID "45" for the communication route passing through the upper-layer switch B and LID "46" for the communication route passing through the upper-layer switch C are allocated.

In such a state, as surrounded by a dotted line in the lower portion of FIG. 7, an LID "16" is used by the computer "3" on which the process "0" is invoked, an LID "21" is used by the computer "4" on which the process "1" is invoked, an LID "26" is used by the computer "5" on which the process "2" is invoked, an LID "28" is used by the computer "6" on which the process "3" is invoked, an LID "33" is used by the computer "7" on which the process "4" is invoked, an LID "38" is used by the computer "8" on which the process "5" is invoked, an LID "40" is used by the computer "9" on which the process "6" is invoked, and an LID "45" is used by the computer "10" on which the process "7" is invoked. Thus, LIDs are selected so that the deviation of the associated upper-layer switches does not occur. Such a method for selecting the LIDs is effective, when the number of computers on which the processes are invoked is a multiple of the number of upper-layer switches to be used. However, such a condition is not always satisfied.

For example, as specifically illustrated in FIG. 7, a case is considered that 3 upper-layer switches are used, 8 processes are invoked and the aforementioned condition is not satisfied. In such a case, it is assumed that the processes "3" to "5" transmit data to the processes "6", "7" and "0", whose number is identified by adding "3" to its own process number. The process "0" is selected because there is not process "8". Then, the lower-layer switch 2, which are connected to the computers "6" to "8" on which the processes "3" to "5" are invoked, is commonly used, and both of the LID "40" of the process "6", which is a transmission destination of the process "3" and LID "16" of the process "0", which is a transmission destination of the process "5", are associated to the upper-layer switch "A". Therefore, the link conflict occurs.

There is no conventional technique, which pays attention to such a problem.

SUMMARY

A method relating to a first aspect includes: (A) obtaining first data including identifiers of selected computers for invocation of parallel processes among a plurality of computers connected to lowest-layer relay apparatuses in a network including relay apparatuses in a plurality of layers, wherein the network includes paths between a relay apparatus in a first layer and plural relay apparatuses in a second layer that is an immediately upper layer than the first layer; and (B) selecting, for each of the selected computers whose identifiers are included in the first data and from network identifiers for respective communication routes in the network, network identifiers to be used for communication with other selected computers so as to avoid coincidence of communication routes between the selected computers for which a same difference value is calculated between identification numbers, wherein the network identifiers are associated in advance with an identifier of each of the plurality of computers and are used for routing in the network, and the identification numbers are assigned for ordering the selected computers.

A method relating to a second aspect includes: (C) controlling, by a plurality of nodes included in a communication system, to switch a state from a first state to a second state, wherein the communication system comprises first switches, second switches connected to the first switches, the plurality of nodes are connected to a plurality of switches included in the first switches, and in the communication system, different communication routes are employed according to addresses used in communication, and communication in the first state is carried out in a communication opponent relationship in which the number of nodes that exist between nodes that carry out communication is a first value when the plurality of nodes are virtually arranged in predetermined order in a ring manner, and communication in the second state is carried out in a communication opponent relationship in which the number of nodes that exist between nodes that carry out communication is a second value; and (D) controlling, by the plurality of nodes, to switch addresses to be used in communication from the first state to the second state, wherein first addresses allocated to the plurality of nodes according to a first pattern are used to carry out communication in the first state, and second addresses allocated to the plurality of nodes according to a second pattern different from the first pattern are used to carry out communication in the second state.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 17C is a diagram depicting an example of a shift distance table relating to the first embodiment;
FIG. 17D is a diagram depicting an example of the shift distance table relating to the first embodiment;
FIG. 17E is a diagram depicting an example of the shift distance table relating to the first embodiment;
FIG. 17F is a diagram depicting an example of the shift distance table relating to the first embodiment;
FIG. 17G is a diagram depicting an example of a second association table relating to the first embodiment.

DESCRIPTION OF EMBODIMENTS

Embodiment 1

Figure 8:
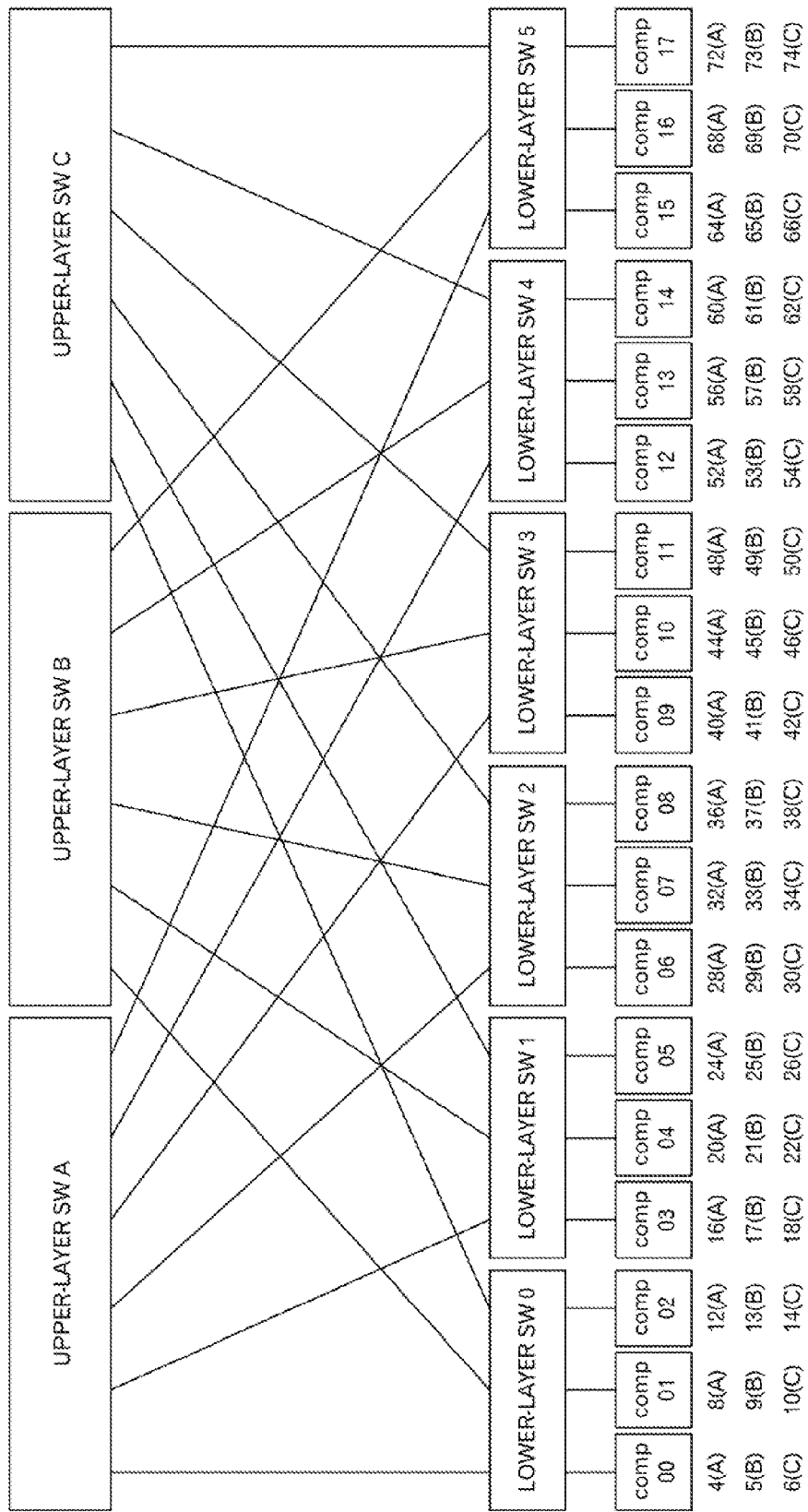
FIG. 8 is a diagram to explain an example of a multi-stage multipath network in a first embodiment.

FIG. 8 illustrates an example of a multi-stage or layer (two or more stages or layers) multipath network relating to an embodiment of this technique. In this example, a network is picked up that paths between each relay apparatus in the lower-layer among the relay apparatuses, which are layered in two or more layers, and plural relay apparatuses in the immediately upper-layer are provided. In the example of FIG. 8, 18 computers comp00 to comp17 are connected by 3 upper-layer switches and 6 lower-layer switches. Each of the lower-layer switches 0 to 5 is connected to the upper-layer switches A to C. In other words, triple communication routes are provided from a certain lower-layer switch to other lower-layer switches. Specifically, a communication route passing through the upper-layer switch A, communication route passing through the upper-layer switch B and communication route passing through the upper-layer switch C exist. In this embodiment, three network identifiers corresponding to the three communication routes (hereinafter, referred to "LID" while assuming explanation is made for InfiniBand) are allocated in advance.

Specifically, in FIG. 8, the allocated LIDs and communication routes (here, identifiers of the upper-layer switches) are illustrated under the respective computers comp00 to comp17. For example, as for the computer comp00, the LID "4" for the communication route passing through the upper-layer switch A, LID "5" for the communication route passing through the upper-layer switch B and LID "6" for the communication route passing through the upper-layer switch C are allocated. In addition, as for the computer comp17, the LID "72" for the communication route passing through the upper-layer switch A, LID "73" for the communication route passing through the upper-layer switch B and LID "74" for the communication route passing through the upper-layer switch C are allocated.

Each of the computers carries out the communication between parallel processes by using LIDs as described later.

Each of the upper-layer switches and lower-layer switches can recognize the output port number corresponding to each of these LIDs. The LID of the destination computer is set into a header of the packets transmitted through such a multi-stage multipath network, and each of the switches can identify to which output port the received packets should be transferred, from this LID.

For example, when the lower-layer switch 5 receives a packet whose LID of the destination computer is "4", the lower-layer switch 5 transfers the packet to the upper-layer switch A. Similarly, when the lower-layer switch 5 receives a packet whose LID of the destination computer is "5", the lower-layer switch 5 transfers the packet to the upper-layer switch B. In addition, when the lower-layer switch 5 receives a packet whose LID of the destination computer is "6", the lower-layer switch 5 transfers the packet to the upper-layer switch C. All of these packets are packets addressed to the computer comp00, and the upper-layer switches through which the packets pass are different as described above.

Figures 9, 10:
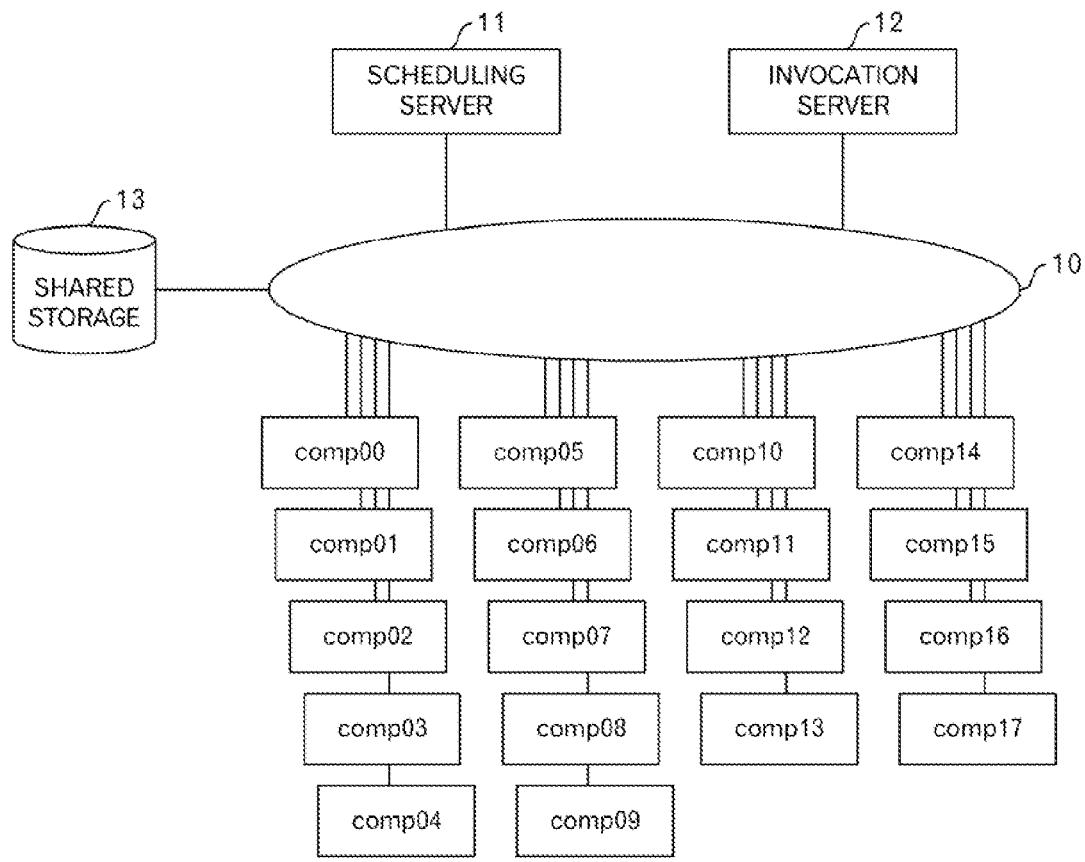
FIG. 9 is a diagram depicting an example of an LID file relating to the first embodiment.
FIG. 10 is a diagram depicting an example of a system in the first embodiment.

In this embodiment, an LID file representing such settings is held in each computer or a shared storage unit described later. FIG. 9 illustrates an example of the LID file corresponding to the settings illustrated in FIG. 8. In an example of FIG. 9, the LID file includes data representing this is an LID file in the first line, the number "3" of upper-layer switches in the second line (namely, the number of communication routes). The LID file includes associations between identifiers of the respective computers and three allocated LIDs in the third line and subsequent lines. In this embodiment, an LID for the communication route passing through the upper-layer switch A, LID for the communication route passing through the upper-layer switch B and LID for the communication route passing through the upper-layer switch C are arranged from the left. Although the arrangement of the LIDs is not limited to such an arrangement, the same arrangement is employed for each computer.

Next, a configuration example of a system including the multi-stage multipath network depicted in FIG. 8 is explained by using FIG. 10. In FIG. 10, the lower-layer switches 0 to 5 and upper-layer switches A to C, which were depicted in FIG. 8, are not clearly illustrated. However, it is assumed that they are included in the network 10 to which the computers comp00 to comp17 are connected. A scheduling server 11, invocation server 12 and shared storage 13, which is used by the computers connected to this network 10, are connected with this network 10.

The scheduling server 11 grasps operational states of the computers comp00 to comp17, next determines parallel processes to be invoked and invocation destination computers of the parallel processes, and instructs the invocation server 12 to invoke the parallel processes. In response to the instruction from the scheduling server 11, the parallel processes are invoked on the designated or selected computers.

In FIG. 10, the invocation server 12 is illustrated as a computer other than the scheduling server 11. However, the invocation server 12 may physically be the same server as the scheduling server 11. Furthermore, a computer described in the top of the host file (i.e. Hostfile), which will be explained later, may operates as the invocation server.

In the following, a case will be explained that 8 parallel processes are invoked on 8 computers in the system illustrated in FIG. 10. In this embodiment, it is assumed that the parallel processes are respectively invoked on different computers.

Figures 11, 12:
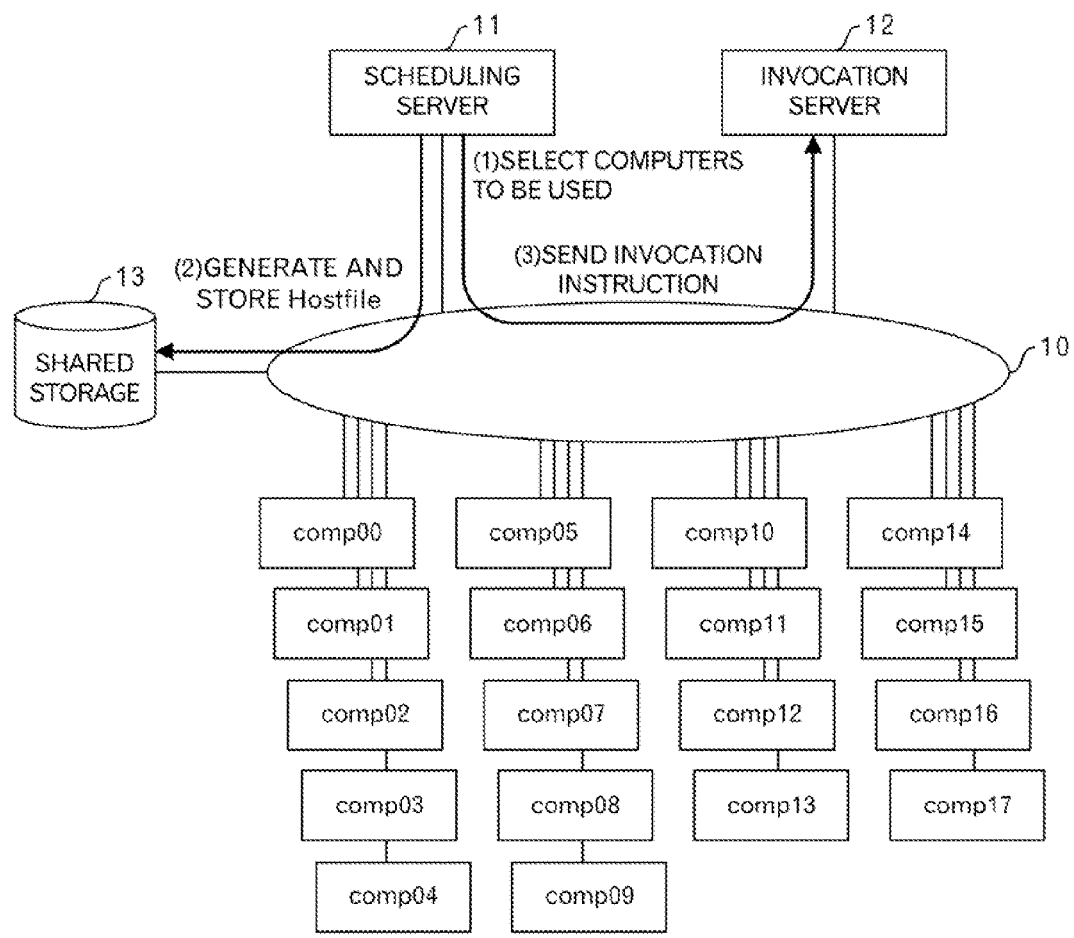
FIG. 11 is a diagram to explain an operation of the system in the first embodiment.
FIG. 12 is a diagram depicting an example of a host file relating to the first embodiment.

In such a specific example, an operation of the system illustrated in FIG. 10 will be explained by using FIGS. 11 to 17G. First, the scheduling server 11 selects computers to be used, from the operational states of the computers comp00 to comp17 (step (1)). For example, computers comp03, comp04, comp05, comp10, comp11, comp12, comp13 and comp14 are selected. Then, the scheduling server 11 generates a host file (i.e. Hostfile) in which identifiers of the selected computers (e.g. computer names) are listed, and stores the host file into the shared storage 13 (step (2)). The host file is a file as illustrated in FIG. 12, for example. As illustrated in FIG. 12, the identifiers of 8 computers selected at the step (1) are included.

Then, the scheduling server 11 instructs the invocation server 12 to invoke the parallel processes on the computers listed in the host file (step (3)). As for the host file, the storage location of the shared storage 13 may be designated or the host file may be transmitted, actually.

Figure 13:
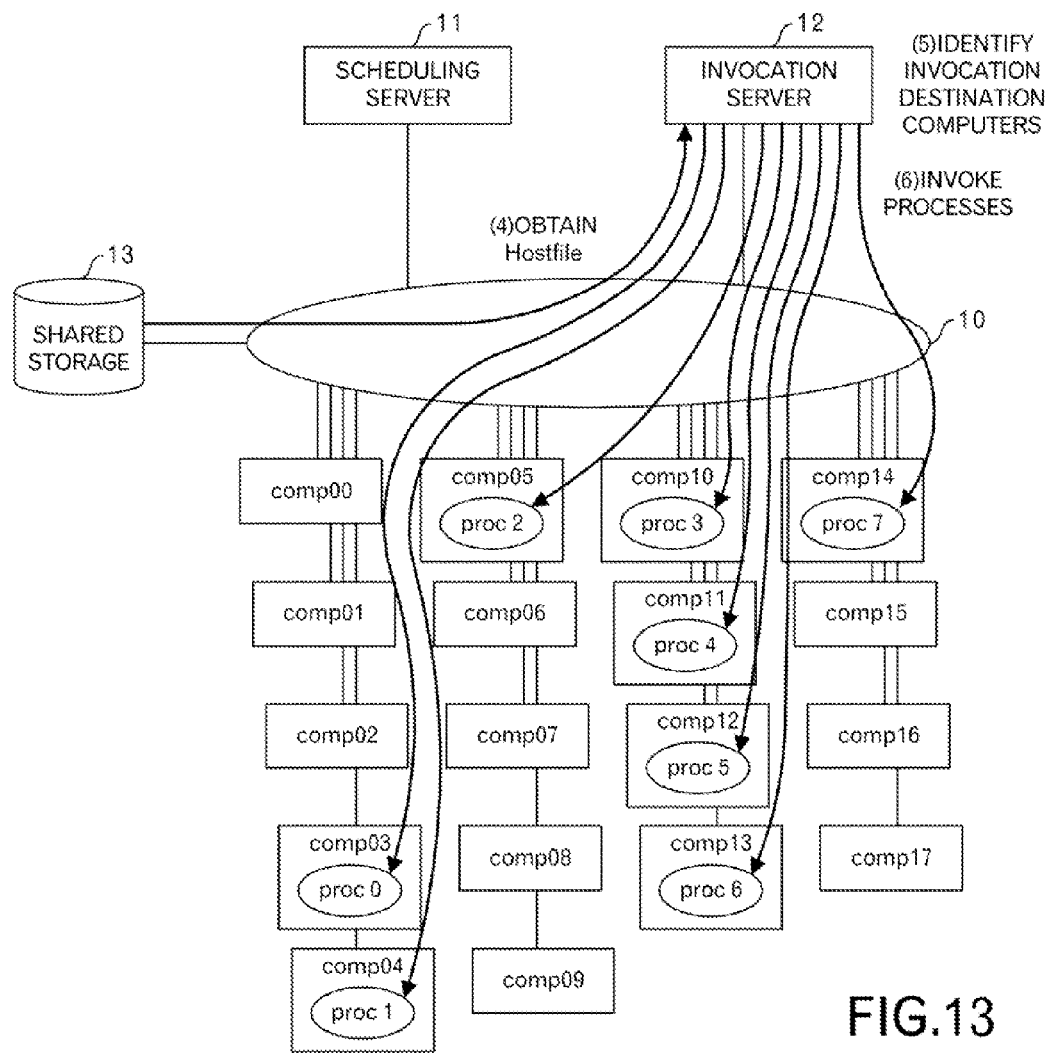
FIG. 13 is a diagram to explain an operation of the system in the first embodiment.

After that, shifting to a processing of FIG. 13, the invocation server 12 obtains the host file stored, for example, in the shared storage 13 (step (4)), and identifies the invocation destination computers comp03, comp04, comp05, comp10, comp11, comp12, comp13 and comp14 that are defined in the host file (step (5)). Then, the invocation server 12 invokes the parallel processes on the invocation destination computers comp03, comp04, comp05, comp10, comp11, comp12, comp13 and comp14 (step (6)). In this case, the invocation server 12 generates an association table for associating identifiers of the processes invoked for the same job and identifiers of the invocation destination computers on which the process is invoked, stores the association table into the shared storage 13, and notifies the invocation destination computers of the storage location of the association table or transmits the association table to the invocation destination computers. Furthermore, an identifier of the process to be invoked on that computer is also notified to the invocation destination computer. Each of the invocation destination computers obtains the association table from the invocation server 12 or shared storage 13, and obtains the identifier of the process to be invoked on its own computer.

Figure 14:
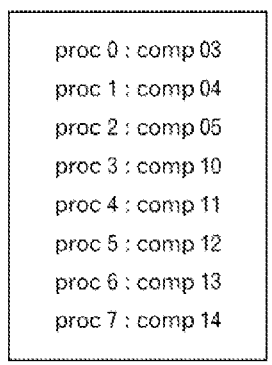
FIG. 14 is a diagram depicting an example of an association table relating to the first embodiment.

FIG. 14 illustrates an example of the association table. In an example of FIG. 14, process identifiers (Proc0, Proc1, Proc2, Proc3, Proc4, Proc5, Proc6 and Proc7. However, a portion "Proc" represents affixed characters to make it easy to understand, and 0 to 7 are identifiers.) are registered in association with the identifiers of the invocation destination computers (comp03, comp04, comp05, comp10, comp11, comp12, comp13 and comp14).

Figure 15:
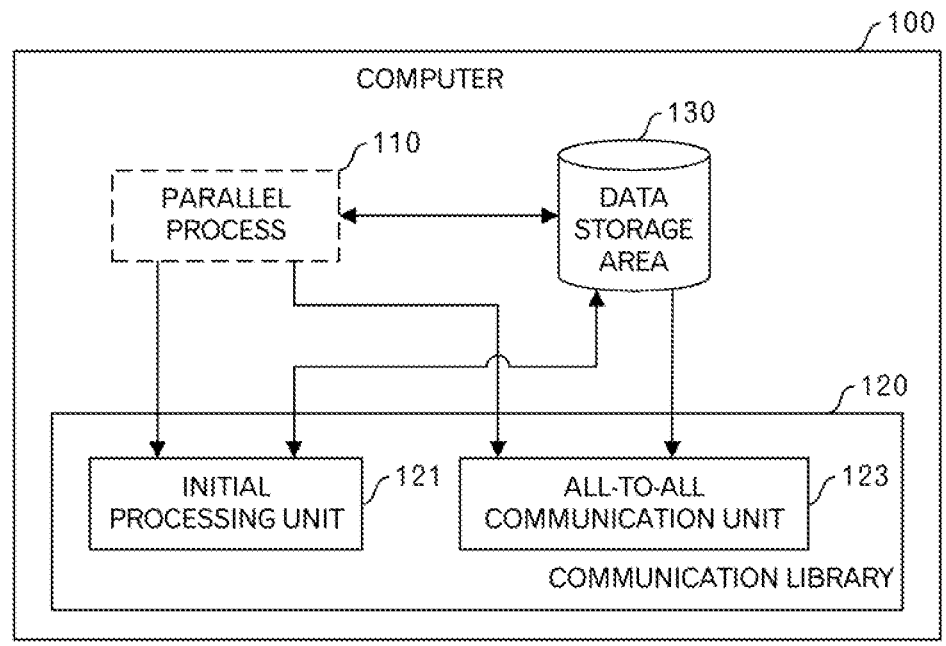
FIG. 15 is a diagram to explain a configuration of a computer on which a parallel process is invoked in the first embodiment.

Next, the invocation destination computer will be explained by using FIGS. 15 to 17G. FIG. 15 schematically illustrates a functional configuration of the invocation destination computer 100, and the invocation server 12 invokes the parallel process 110 on the invocation destination computer 100, dynamically. Data associated with the processing of this parallel process 110 is stored in a data storage area 130. Data concerning the structure of the network 10 is also stored in this data storage area 130. In other words, the connection relationship between the upper-layer switches and the lower-layer switches and the identifiers of the computers connected to the lower-layer switches are stored in the data storage area 130.

In addition, a communication library 120 has also been prepared in the invocation destination computer 100. The communication library 120 is a library that follows the MPI specification, for example, and includes an initial processing unit 121 corresponding to an MPI_Init subroutine and an All-to-All communication unit 123 corresponding to an MPI_ AlltoAll subroutine. The parallel process 110 causes the initial processing unit 121 to carry out an initial processing for the interprocess communication after invoking the initial processing unit 121, and causes the All-to-All communication unit 123 to carry out the All-to-All communication among all of the parallel processes that were invoked for the same job after invoking the All-to-All communication unit 123 when conducting the All-to-All communication. The initial processing unit 121 and All-to-All communication unit 123 in the communication library 120 carry out a processing using data stored in the data storage area 130, if necessary. Incidentally, the communication library 120 includes other subroutines. However, here, only subroutines relating to this embodiment are illustrated.

Figure 16:
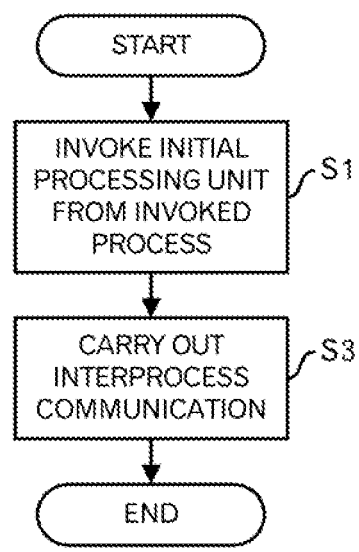
FIG. 16 is a diagram to explain an operation of the computer on which the parallel process is invoked in the first embodiment.

Next, a specific processing will be explained by using FIGS. 16 to 17G. First, the invoked parallel process 110 invokes the initial processing unit 121 of the communication library 120 (FIG. 16: step S1). When invoked, the initial processing unit 121 carries out a processing as illustrated in FIG. 17A.

Figure 17A:
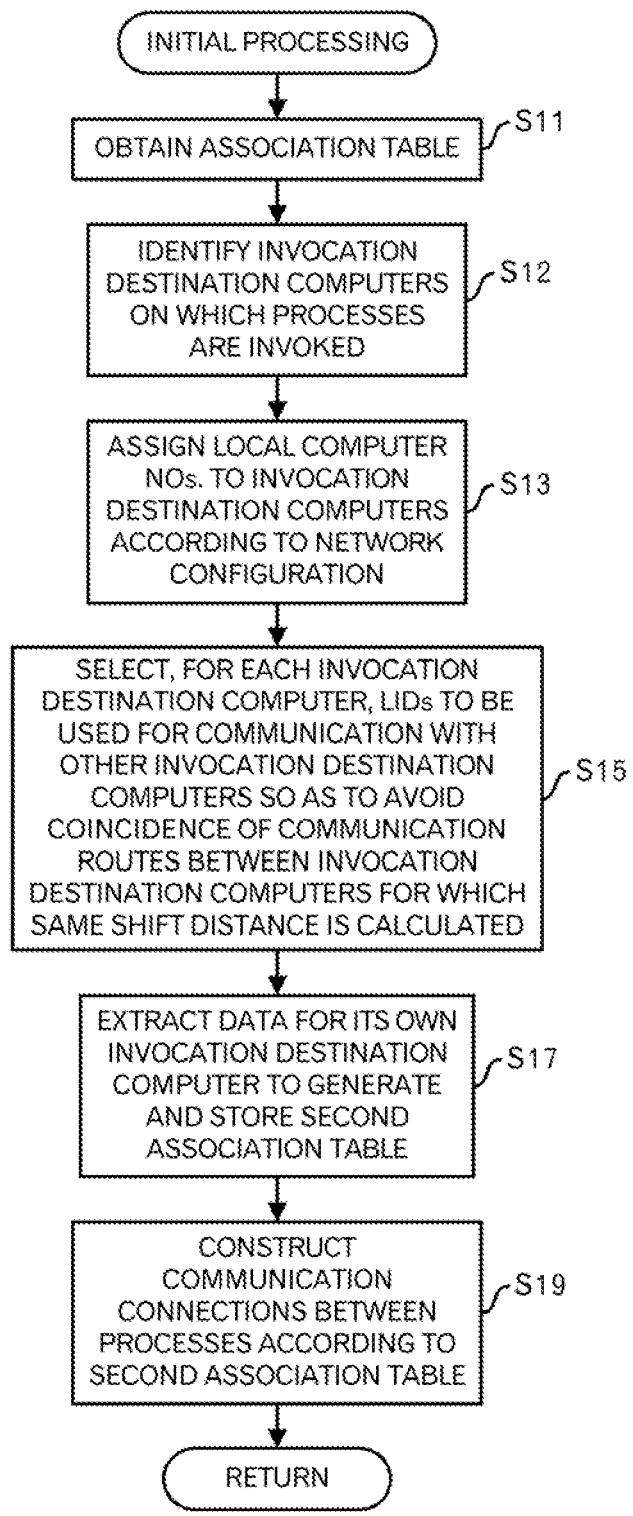
FIG. 17A is a diagram to explain an operation of an initial processing unit relating to the first embodiment.

The initial processing unit 121 obtains the association table (FIG. 17A: step S11). When the association table is stored in the data storage area 130, the initial processing unit 121 reads the association table from the data storage area 130, and when the association table is stored in the shared storage 13, the initial processing unit 121 obtains the association table from the shared storage 13.

Figure 17B:
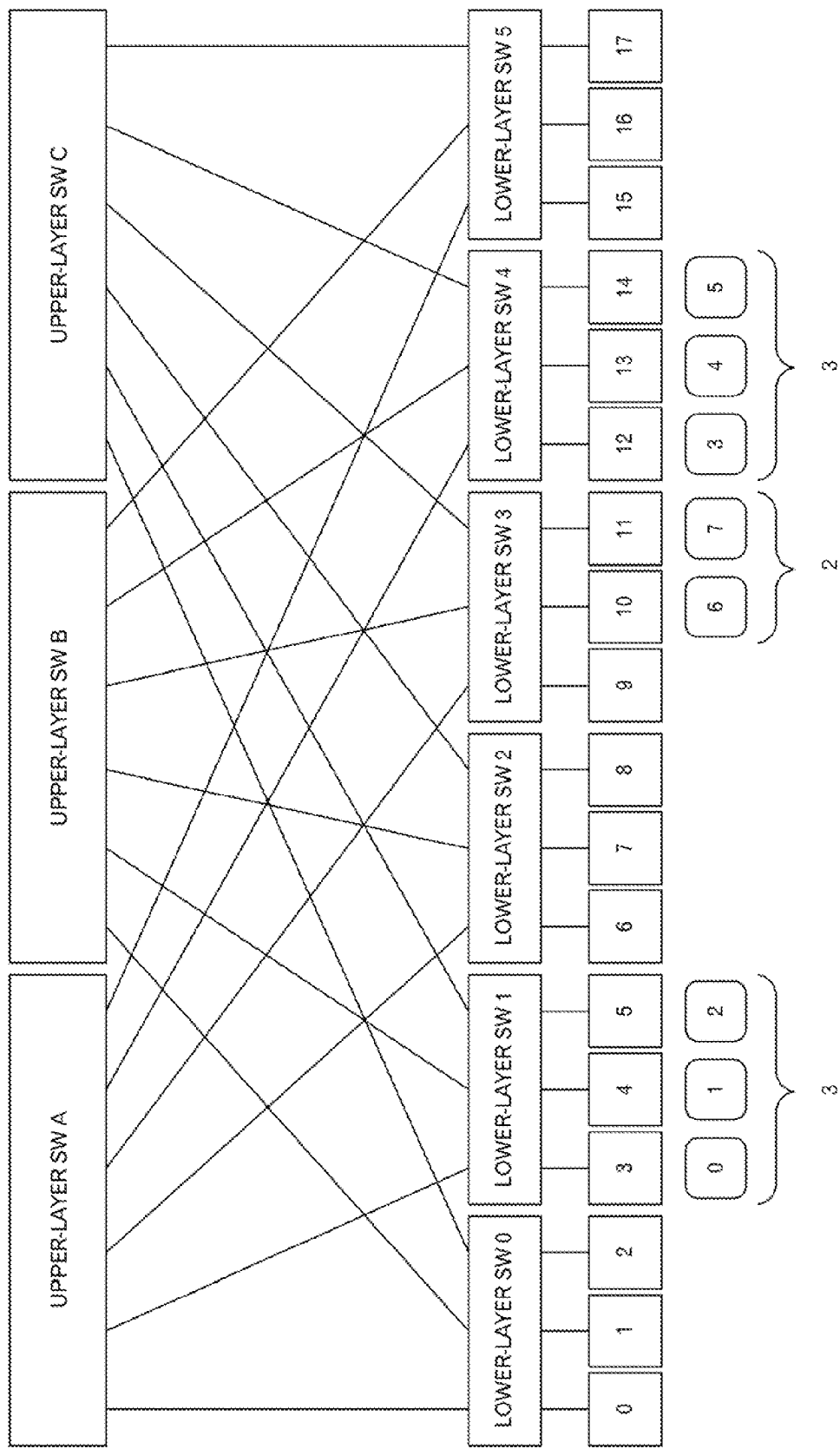
FIG. 17B is a diagram to explain assignment of local computer numbers relating to the first embodiment.

In addition, the initial processing unit 121 identifies the invocation destination computers on which the processes are invoked (step S12), and assigns a local computer number to each of the invocation destination computers according to data of the network configuration, which is stored in the data storage area 130 (step S13). For example, as schematically illustrated in FIG. 17B, the invocation destination computers are grouped for each of the lower-layer switches, and the groups are sorted in descending order of the number of invocation destination computers included in the group. In an example of FIG. 17B, as for the lower-layer switches 1 and 4, the number of invocation destination computers is "3", and as for the lower-layer switch 3, the number of invocation destination computers is "2". When the groups are sorted in order of the identifiers of the switches in case where the same number of computers is counted for plural lower-layer switches, the sort result represents the lower-layer switch 1, lower-layer switch 4 and lower-layer switch 3 in sequence. As for the invocation destination computers connected to each of the lower-layer switches, the order of the invocation destination computers follows the identifiers of the computers, for example. Then, a local computer number "0" is assigned to the invocation destination computer comp03, a local computer number "1" is assigned to the invocation destination computer comp04, a local computer number "2" is assigned to the invocation destination computer comp05, a local computer number "3" is assigned to the invocation destination computer comp12, a local computer number "4" is assigned to the invocation destination computer comp13, a local computer number "5" is assigned to the invocation destination computer comp14, a local computer number "6" is assigned to the invocation destination computer comp10, and a local computer number "7" is assigned to the invocation destination computer comp11.

Next, the initial processing unit 121 selects, for each invocation destination computer, an LID to be used for the communication with other invocation destination computers, from the LID file (FIG. 9) so as to avoid coincidence of the communication routes between the invocation destination computers for which the same shift distance is calculated (step S15). In the typical All-to-All communication, as explained in FIGS. 2A to 2H, the communication is carried out from one invocation destination computer to all of the other invocation destination computers while shifting the communication opponent one by one. In this embodiment, the width of shifting the communication opponent is called shift distance, and the shift distance is represented by a difference between the local computer numbers. For example, in case of the communication from the invocation destination computer having the local computer number "1" to the invocation destination computer having the local computer number "3", the shift distance is "2".

As described above, in the typical All-to-All communication, the communications between the invocation destination computers for which different shift distances are calculated are not carried out in the same period. Therefore, when the communication routes between the invocation destination computers for which the same shift distance is calculated do not coincide, the link conflict can be avoided. Therefore, for each shift distance, the upper-layer switches and LIDs are selected so that the communication routes between the invocation destination computers for which the same shift distance is calculated do not coincide.

For example, for each local computer number of the invocation destination computer of the transmission source, the local computer numbers of the invocation destination computers of the communication destination are identified for each shift distance. However, in case of the communication between the invocation destination computers under the same lower-layer switch, the upper-layer switches are not used. Therefore, such combinations of the invocation destination computers are not considered. For example, as illustrated in FIG. 17C, in case of the invocation destination computer of the local computer number "5", the communication is carried out with the invocation destination computer of the local computer number "6" in case of the shift distance "1", the communication is carried out with the invocation destination computer having the local computer number "7" in case of the shift distance "2", the communication is carried out with the invocation destination computer having the local computer number "0" in case of the shift distance "3", the communication is carried out with the invocation destination computer having the local computer number "1" in case of the shift distance "4", and the communication is carried out with the invocation destination computer having the local computer number "2" in case of the shift distance "5". In case of the shift distance "6", the invocation destination computer having the local computer number "5" communicates with the invocation destination computer having the local computer number "3". Because the lower-layer switch is the same, this case is not considered. In case of the shift distance "7", the invocation destination computer having the local computer number "5" communicates with the invocation destination computer having the local computer number "4". Because the lower-layer switch is the same, this case is not also considered.

Incidentally, in view of the coincidence of the communication routes, the coincidence is considered for not only the upward direction that is a direction to the upper-layer switch but also the downward direction from the upper-layer switch to the lower-layer switch. Then, in the table of FIG. 17C, symbols "x" for the lower-layer switch 1, "y" for the lower-layer switch 4 and "z" for the lower-layer switch 3 are used, and the local computer numbers of the communication opponents are also considered.

Then, for each shift distance, the upper-layer switches are allocated so that the communication routes in the upward direction do not coincide. For example, as illustrated by a table in FIG. 17D, for each shift distance, the upper-layer switches are allocated, distributedly. Especially, as for the invocation destination computers whose lower-layer switch is the same, the same upper-layer switch is not allocated. However, it is not possible to avoid the coincidence of the communication route unless the coincidence of the communication route in the downward direction from the upper-layer switch to the lower-layer switch is considered, as described above. Then, for each shift distance, it is determined whether or not a portion exists in the table, that combinations of symbols "x", "y" and "z" of the lower-layer switches and symbols "A", "B" and "C" of the upper-layer switches coincide. In an example of FIG. 17D, in case of the shift distance "4", "5yB" is registered for the local computer number "5" of a computer that is a communication opponent of a computer having the local computer number "1", and "3yB" is registered for the local computer number "3" of a computer that is a communication opponent of a computer having the local computer number "7". In this case, the link conflict may occur at a path between the upper-layer switch B and the lower-layer switch 4 (which corresponds to "y"). Therefore, it is better that any other upper-layer switch is allocated. Similarly, in case of the shift distance "5", "5yA" is registered for the local computer number "5" of a computer that is a communication opponent of a computer having the local computer number "0", and "3yA" is registered for the local computer number "3" of a computer that is a communication opponent of a computer having the local computer number "6". In this case, the link conflict may occur at a path between the upper-layer A and the lower-layer switch 4 (which corresponds to "y"). Therefore, it is better that any other upper-layer switch is allocated.

For example, as illustrated in FIG. 17E, as for the local computer numbers "6" and "7", the upper-layer switches, which are included in the portion having the coincidence of the communication routes are selected again so that the coincidence does not occur. Thus, for each shift distance, the upper-layer switch can be selected so that the communication routes do not coincide.

Incidentally, when the upper-layer switch is selected, a corresponding LID is identified from the LID file according to the combination with the invocation destination computer of the communication opponent. Specifically, the local computer number of the invocation destination computer is converted to the identifier of the computer, which is included in the LID file, according to the association at the step S13. Then, for each invocation destination computer, an LID corresponding to the allocated upper-layer switch is identified from among the LIDs associated with the identifier of the invocation destination computer. For example, selection results are obtained as illustrated in FIG. 17F. Incidentally, when the invocation destination computer under the same lower-layer switch is a communication opponent, any LID can be selected. Here, the LID is selected, randomly.

The aforementioned method is a simplified method, and other methods may be employed.

Returning to the explanation of the processing illustrated in FIG. 17A, the initial processing unit 121 extracts data for its own invocation destination computer to generate a second association table, and stores the second association table into the data storage area 130 (step S17). For example, when the local computer number of its own invocation destination computer is "2" and the identifier of its own computer is "comp05", the second association table as illustrated in FIG. 17G is generated. Specifically, data in the line whose local computer number is "2" is read out in FIG. 17F, and the local computer number is converted into the identifier of the computer. Then, the LID corresponding to the identifier of the computer in the association table (FIG. 14) is identified and registered. Thus, for each process of the communication opponent or each invocation destination computer, it is possible to identify the LID to be used.

Thus, in this embodiment, the LID is not fixedly allocated to each invocation destination computer. Namely, for each combination of the invocation destination computers, an appropriate LID is selected to avoid the coincidence of the communication route between the invocation destination computers for which the same shift distance is calculated, for each shift distance. Therefore, it is possible to avoid the link conflict in the communication and to improve the communication performance.

The aforementioned processing is carried out in parallel in each of the invocation destination computers.

Then, the initial processing unit 121 constructs communication connections between the processes according to the second association table generated at the step S17 (step S19). This processing itself is the same as the conventional processing. Therefore, the detailed explanation is omitted.

By carrying out such a processing, the preparation for the communication with the parallel process on other invocation destination computers is complete.

Then, returning to the explanation of the processing in FIG. 16, the parallel process 110 carries out the interprocess communication by using the communication connection constructed at the step S19 according to its own program (step S3). This interprocess communication may be All-to-All communication by the All-to-All communication unit 123 but may be peer-to-peer communication. The step S3 is carried out until the processing of the parallel process 110 is complete.

By carrying out the aforementioned processing, it becomes possible to enhance the communication performance by avoiding the link conflict.

Embodiment 2

Figure 18:
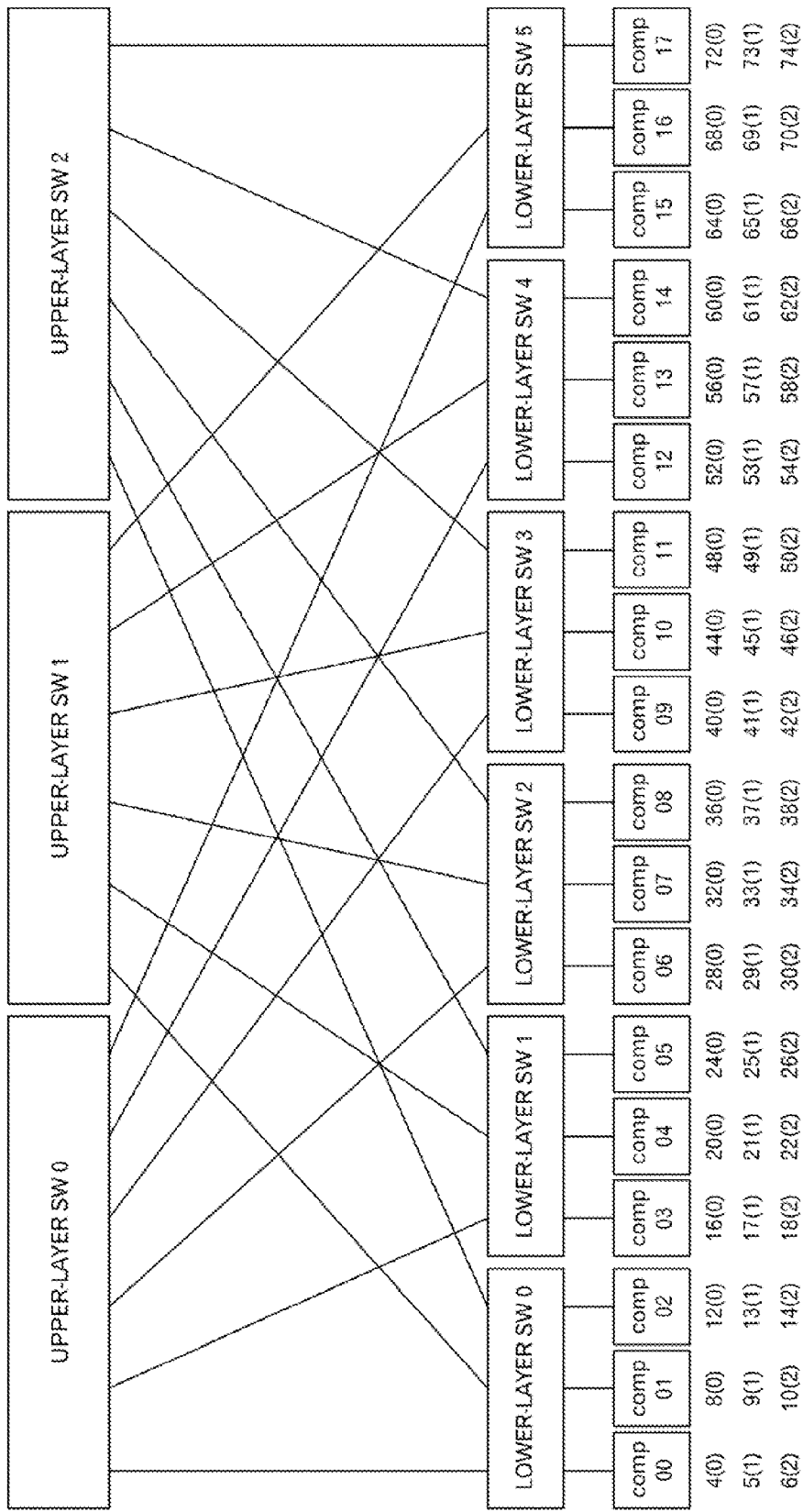
FIG. 18 is a diagram depicting an example of a multi-stage multipath network in a second embodiment.

An example of a multi-stage multipath network relating to a second embodiment (e.g. a network in which paths are provided between each lower-layer relay apparatus and plural immediately upper-layer relay apparatuses among relay apparatuses layered in two or more layers.) is represented in FIG. 18. In an example of FIG. 18, three upper-layer switches 0 to 2, 6 lower-layer switches 0 to 5 are used to connect 18 computers comp00 to comp17. Each of the lower-layer switches 0 to 5 are connected to the upper-layer switches 0 to 2. In other words, the communication route from a certain lower-layer switch to another lower-layer switch is tripled. Specifically, the communication route passing through the upper-layer switch 0, communication route passing through the upper-layer switch 1 and communication route passing through the upper-layer switch 2 exist. In this embodiment, three network identifiers that are used for the routing and correspond to these three communication routes (hereinafter, referred to LID, because an example using InfiniBand will be explained.) are allocated to each computer.

Specifically, in FIG. 18, the allocated LIDs and communication routes (here, identifiers of the upper-layer switches) are represented under each of the computers comp00 to comp17 in FIG. 18. For example, as for the computer comp03, the LID "16" for the communication route passing through the upper-layer switch 0, LID "17" for the communication route passing through the upper-layer switch 1 and LID "18" for the communication route passing through the upper-layer switch 2 are allocated. In addition, as for the computer comp12, the LID "52" for the communication route passing through the upper-layer switch 0, LID "53" for the communication route passing through the upper-layer switch 1 and LID "54" for the communication route passing through the upper-layer switch 2 are allocated.

Each of the computers carries out the communication between the parallel processes by using LIDs as will be described later.

Each of the upper-layer switches and lower-layer switches can identify the output port number corresponding to each of these LIDs. The LID of the destination computer is set to a header of the packet transmitted in such a multi-stage multipath network, and each of the switches can identify, from this LID, to which output port the received packet should be transferred.

For example, when the lower-layer switch 4 receives a packet whose LID of the destination computer is "20", the packet is transferred to the upper-layer switch 0. Similarly, when the lower-layer switch 4 receives a packet whose LID of the destination computer is "21", the packet is transferred to the upper-layer switch 1. In addition, when the lower-layer switch 4 receives a packet whose LID of the destination computer is "22", the packet is transferred to the upper-layer switch 2. All of these packets are packets addressed to the computer comp04. However, the upper-layer switches through which the packets pass are different as described above.

Figures 19, 20:
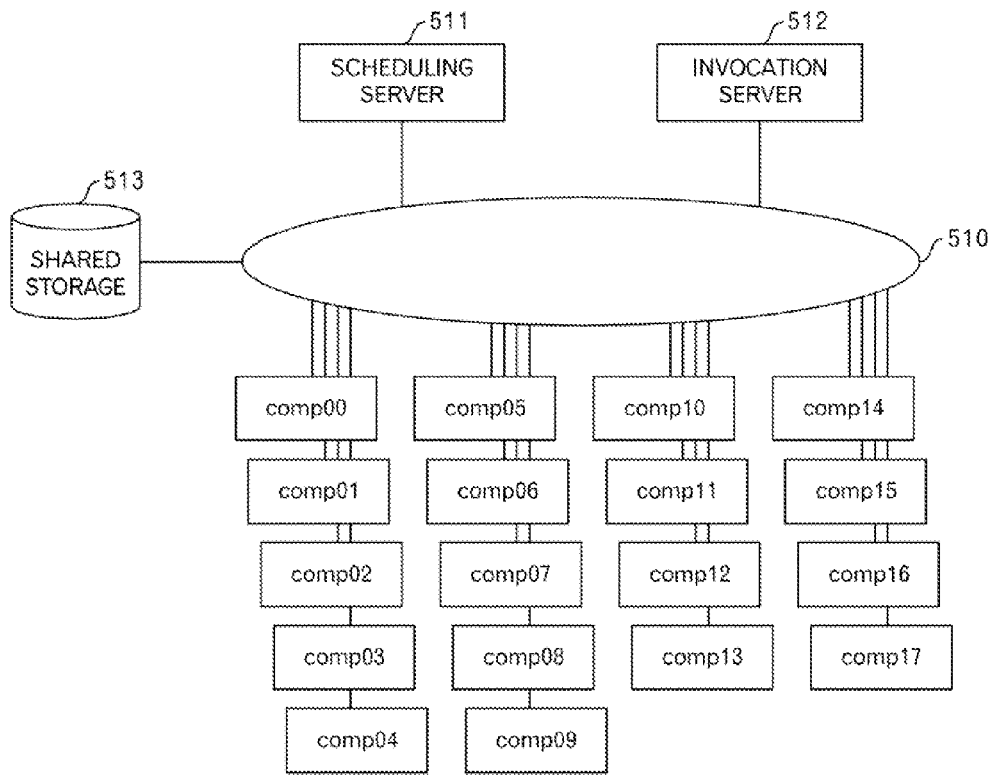
FIG. 19 is a diagram depicting an LID file relating to the second embodiment.
FIG. 20 is a diagram depicting an example of a system in the second embodiment.

In this embodiment, an LID file representing such settings is held in each of the computer or a shared storage described later. FIG. 19 illustrates an example of the LID file corresponding to the settings illustrated in FIG. 18. In the example of FIG. 19, data representing this file is an LID file is included in the first line of the LID file, the number "3" of upper-layer switches (i.e. the number of communication routes) is included in the second line of the LID file. The number of upper-layer switches will be used for the processing described later. In the third line and subsequent lines, associations between the identifier of each computer and three allocated LIDs are included. In this embodiment, the LID for the communication route passing through the upper-layer switch 0, LID for the communication route passing through the upper-layer switch 1 and LID for the communication route passing through the upper-layer switch 2 are arranged from the left. Although the arrangement is not limited to this example, the same arrangement is employed for each computer.

Next, a configuration example of a system including the multi-stage multipath network depicted in FIG. 18 is explained by using FIG. 20. In FIG. 20, the upper-layer switches 0 to 2 and lower-layer switches 0 to 5, which were depicted in FIG. 18, are not illustrated. However, it is assumed that the computers comp00 to comp17 are included in a network 510. A scheduling server 511, invocation server 512 and shared storage 513 used by the computers connected to the network 510 are connected to this network 510.

The scheduling server 511 grasps operational states of the computer comp00 to comp17, determines the parallel processes to be invoked next and invocation destination computers of the parallel processes and instructs the invocation server 512 to invoke the parallel processes. The invocation server 512 invokes the parallel processes on the designated or selected computers in response to the instruction from the scheduling server 511.

In FIG. 20, the invocation server 512 is represented as another computer different from the scheduling server 511. However, the invocation server 512 may be physically the same computer as the scheduling server 511. Furthermore, the top computer described in a host file (Hostfile) described later may operate as the invocation server.

In the following, a case is explained that 8 parallel processes are invoked on 8 computers in the system as illustrated in FIG. 20. In this embodiment, it is assumed that each of the parallel processes is respectively invoked on a different computer.

Figures 21, 22:
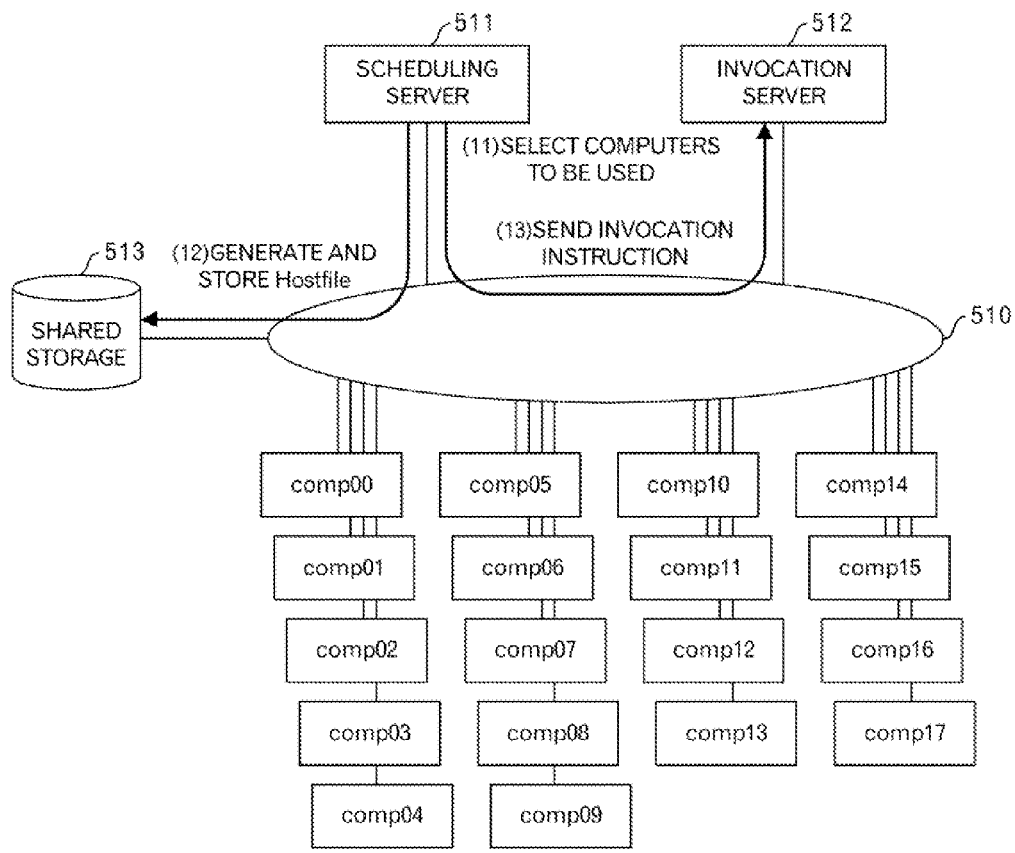
FIG. 21 is a diagram to explain an operation of the system relating to the second embodiment.
FIG. 22 is a diagram to explain an example of a host file relating to the second embodiment.

As for such a specific example, an operation of the system illustrated in FIG. 20 will be explained by using FIGS. 21 to 41. First, the scheduling server 511 selects computers to be used from the operational states of the computers comp00 to comp17 (step (11)). For example, the computers comp03, comp04, comp05, comp10, comp11, comp12, comp13 and comp14 are selected. Then, the scheduling server 511 generates a host file (Host file) in which identifiers of the selected computers (e.g. computer names) are listed, and stores the host file into the shared storage 513 (step (12)). The host file is a file as illustrated in FIG. 22, for example. As depicted in FIG. 22, 8 identifiers of 8 computers selected at the step (11) are included.

Then, the scheduling server 511 instructs the invocation server 512 to invoke the parallel processes on the computers listed in the host file (step (13)). As for the host file, the storage location of the shared storage 513 may be designated or the host file may actually be transmitted.

Figure 23:
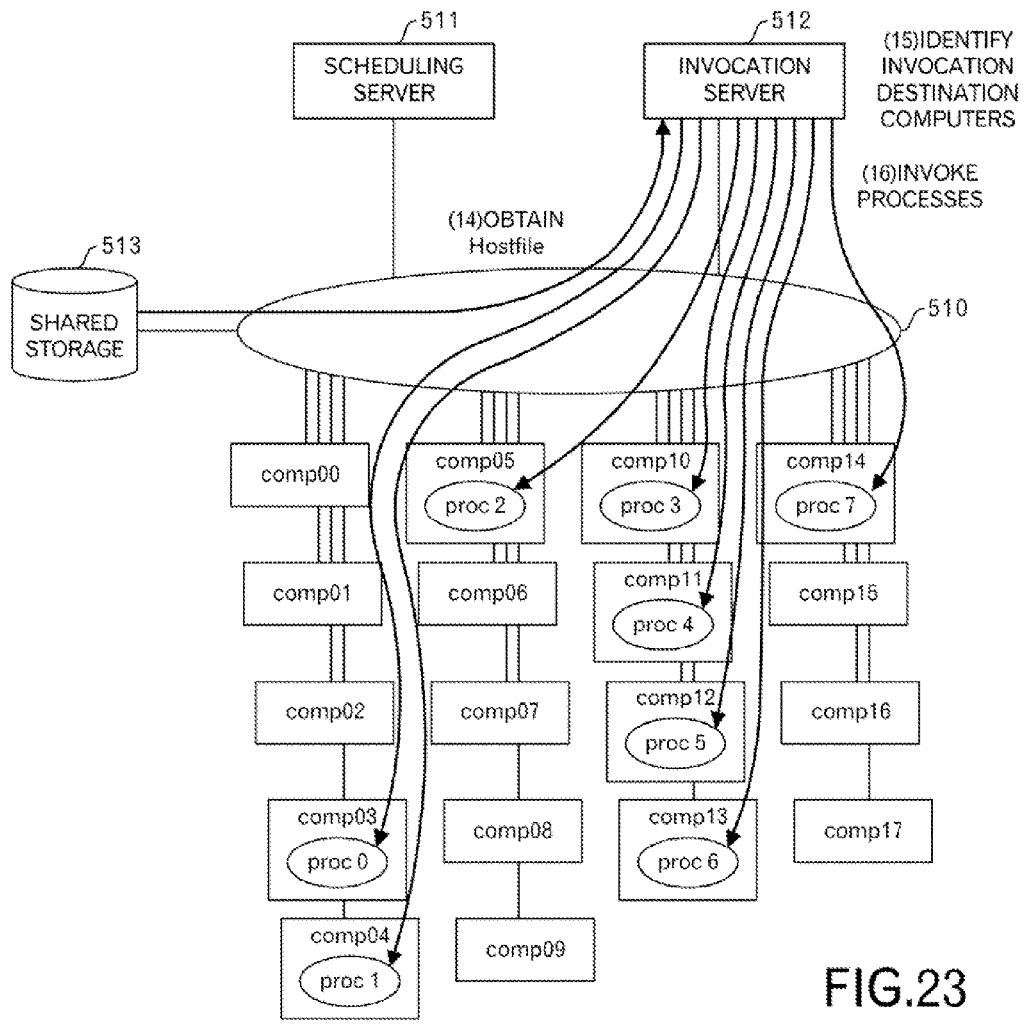
FIG. 23 is a diagram to explain the operation of the system in the second embodiment.

After that, shifting to a processing of FIG. 23, the invocation server 512 obtains the host file stored, for example, in the shared storage 513 (step (14)), and identifies the invocation destination computers comp03, comp04, comp05, comp10, comp11, comp12, comp13 and comp14, which are defined in the host file (step (15)). Then, the invocation server 512 invokes the parallel processes on the invocation destination computers comp03, comp04, comp05, comp10, comp11, comp12, comp13 and comp14 (step (16)). At this time, the invocation server 512 generate an association table in which identifiers of the invoked processes for the same job and identifiers of the invocation destination computers on which the processes are invoked, and notifies the invocation destination computers of the storage location of the association table after storing the association table into the shared storage 513 or transmits the association table to the invocation destination computers. An identifier of the process invoked on its own computer is further notified to the invocation destination computer. Each of the invocation destination computers obtains the association table from the invocation computer 512 or shared storage 513, and also obtains the identifier of the process to be invoked on its own computer.

Figure 24:
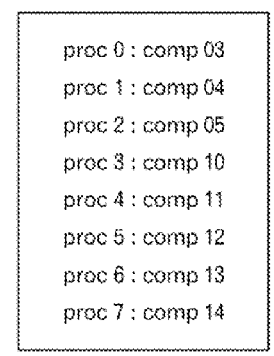
FIG. 24 is a diagram depicting an example of an association table relating to the second embodiment.

FIG. 24 illustrates an example of the association table. In the example of FIG. 24, the process identifiers (Proc0, Proc1, Proc2, Proc3, Proc4, Proc5, Proc6 and Proc7. However, a portion "Proc" represents affixed characters to make it easy to understand, and 0 to 7 are identifiers.) are associated with the identifiers of the invocation destination computers (comp03, comp04, comp05, comp10, comp11, comp12, comp13 and comp14).

Figure 25:
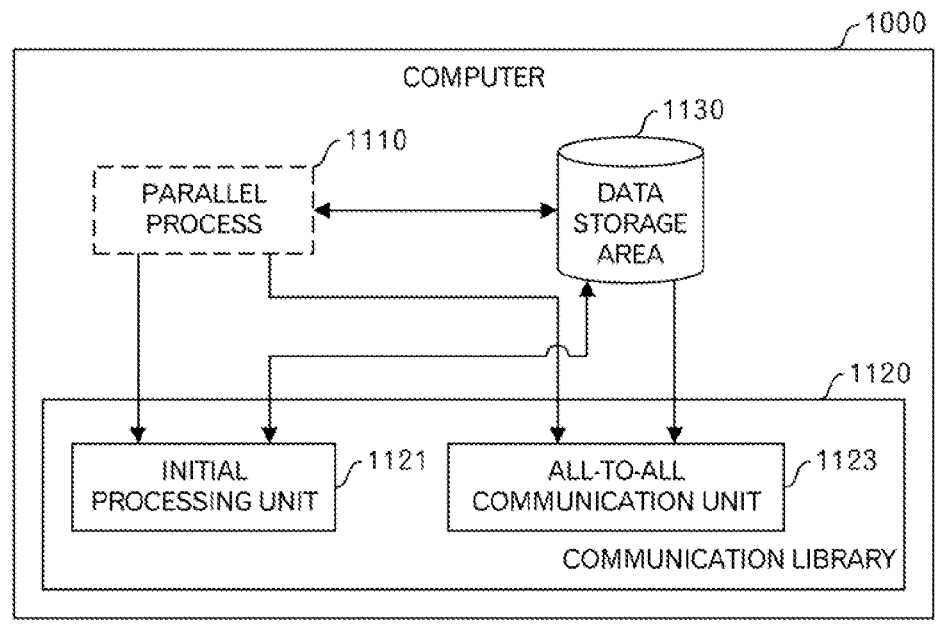
FIG. 25 is a diagram to explain a configuration of a computer on which a parallel process is invoked in the second embodiment.

Next, the invocation destination computer will be explained by using FIGS. 25 to 41. FIG. 25 schematically illustrates a functional configuration of the invocation destination computer 1000, and a parallel process 1110 is invoked on the invocation destination computer 1000 by the invocation server 512, dynamically. Data associated with the processing of this parallel process 1110 is stored in the data storage area 1130. Data concerning the structure of the network 510 is also included in this data storage area 1130. Namely, the connection relation among the upper-layer switches and the lower-layer switch and identifiers of the computers connected to the lower-layer switches is stored in the data storage area 1130.

Moreover, a communication library 1120 has also been prepared in the invocation destination computer 1000. The communication library 1120 is a library that follows the MPI specification, for example, and includes an initial processing unit 1121 corresponding to an MPI_Init subroutine and All-to-All communication unit 1123 corresponding to an MPI_AlltoAll subroutine. The parallel process 1110 invokes the initial processing unit 1121 to cause the initial processing unit 1121 to carry out an initial processing for the interprocess communication, and invokes the All-to-All communication unit 1123 to causes the All-to-All communication unit 1123 to carry out the All-to-All communication between all of the parallel processes invoked for the same job when the All-to-All communication is carried out. The initial processing unit 1121 and All-to-All communication unit 1123 of the communication library 1120 may process data stored in the data storage area 1130, if necessary. Incidentally, other subroutines are also included in the communication library 1120. However, subroutines only relating to this embodiment are illustrated, here.

Figure 26:
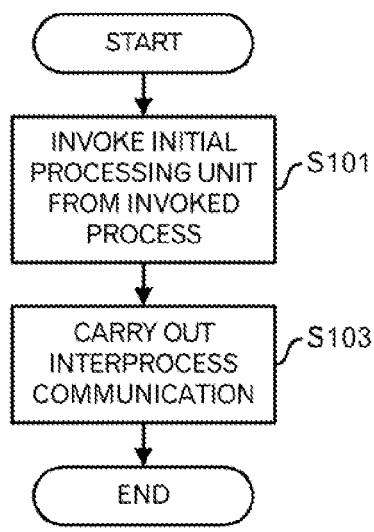
FIG. 26 is a diagram to explain the operation of the computer on which the parallel process is invoked in the second embodiment.

Next, a specific processing will be explained by using FIGS. 26 and 27. First, the parallel process 1110 that was invoked invokes the initial processing unit 1121 of the communication library 1120 (FIG. 26: step S101). When the initial processing unit 1121 is invoked, the initial processing is carried out as illustrated in FIG. 27.

Figure 27:
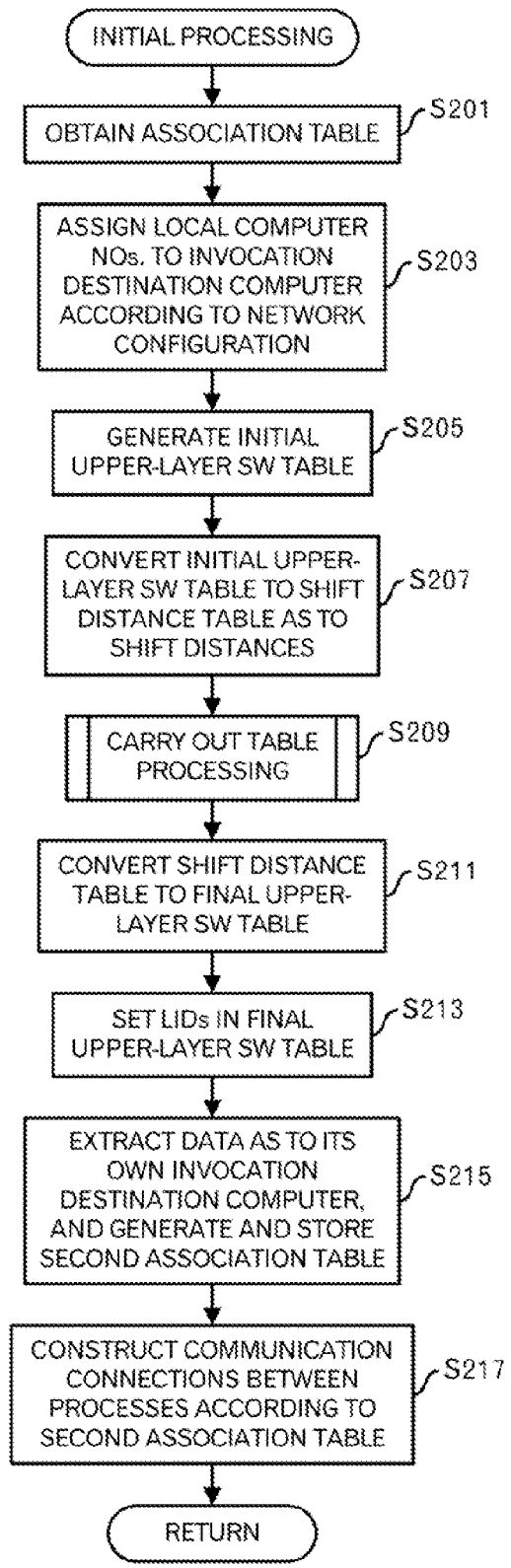
FIG. 27 is a diagram to explain an operation of an initial processing unit in the second embodiment.

The initial processing unit 1121 obtains the association table (FIG. 27: step S201). When the association table is stored in the data storage area 1130, the initial processing unit 1121 reads the association table from the data storage area 1130, and when the association table is stored in the shared storage 513, the initial processing unit 1121 obtains the association table from the shared storage 513.

Figure 28:
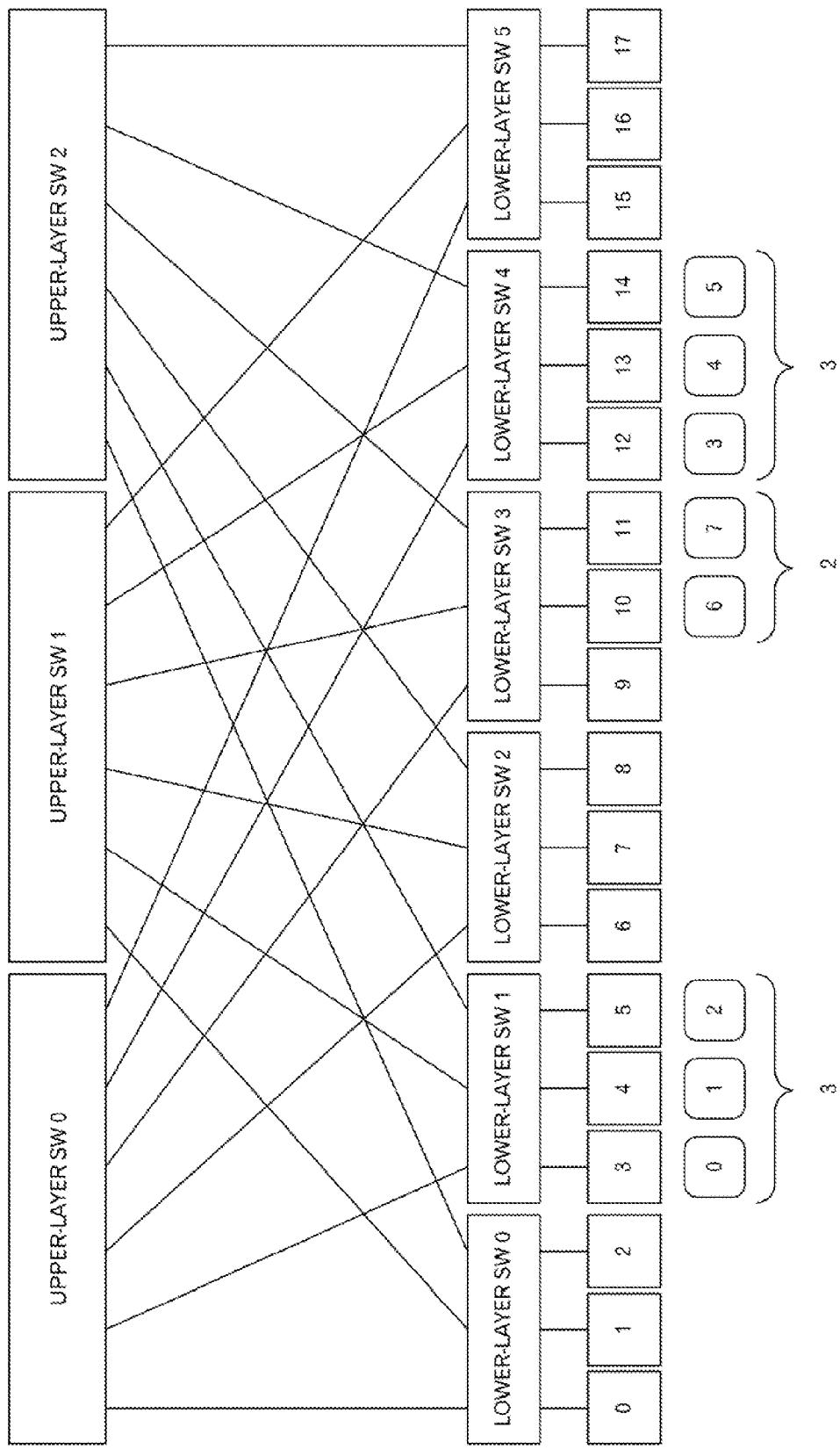
FIG. 28 is a diagram to explain assignment of local computer numbers relating to the second embodiment.

Moreover, the initial processing unit 1121 identifies the invocation destination computer on which the processes are invoked from the association table, and assigns local computer numbers to the respective invocation destination computers according to the data of the network configuration, which is stored in the data storage area 1130 (step S203). For example, as schematically illustrated in FIG. 28, at the first stage, the invocation destination computers are grouped for each lower-layer switches, and the groups are sorted by the number of invocation destination computers included in the respective groups. When plural groups including the same number of invocation destination computers exist, the priority is given to the group in which the identifier of the included lower-layer switch is smaller. Then, as the second stage, in order of the sorted group, the local computer number is assigned from 0 in order of the identifier of the computer for each group, for example.

In an example of FIG. 28, as for the group of the lower-layer switch 1 and group of the lower-layer switch 4, the number of invocation destination computers is "3", and as for the group of the lower-layer switch 3, the number of invocation destination computers is "2". When they are sorted, the order of the group of the lower-layer switch 1, group of the lower-layer switch 4 and group of the lower-layer switch 3 is obtained.

The local computer numbers are assigned as illustrated in FIG. 28 according to the identifiers of the computers for the invocation destination computers connected to each of the lower-layer switches. Specifically, the local computer number "0" is assigned to the invocation destination computer comp03, the local computer number "1" is assigned to the invocation destination computer comp04, the local computer number "2" is assigned to the invocation destination computer comp05, the local computer number "3" is assigned to the invocation destination computer comp12, the local computer number "4" is assigned to the invocation destination computer comp13, the local computer number "5" is assigned to the invocation destination computer comp14, the local computer number "6" is assigned to the invocation destination computer comp10, and the local computer number "7" is assigned to the invocation destination computer comp11.

By adopting such an assigning method of the local computer number, it becomes easy to avoid the coincidence of the communication route.

Then, the initial processing unit 1121 generates an initial upper-layer switch table from the number of upper-layer switches included in the LID file and data for the network configuration, which is stored in the data storage area 1130, and stores the initial upper-layer switch table into the data storage area storage 1130 (step S205).

Figure 29:
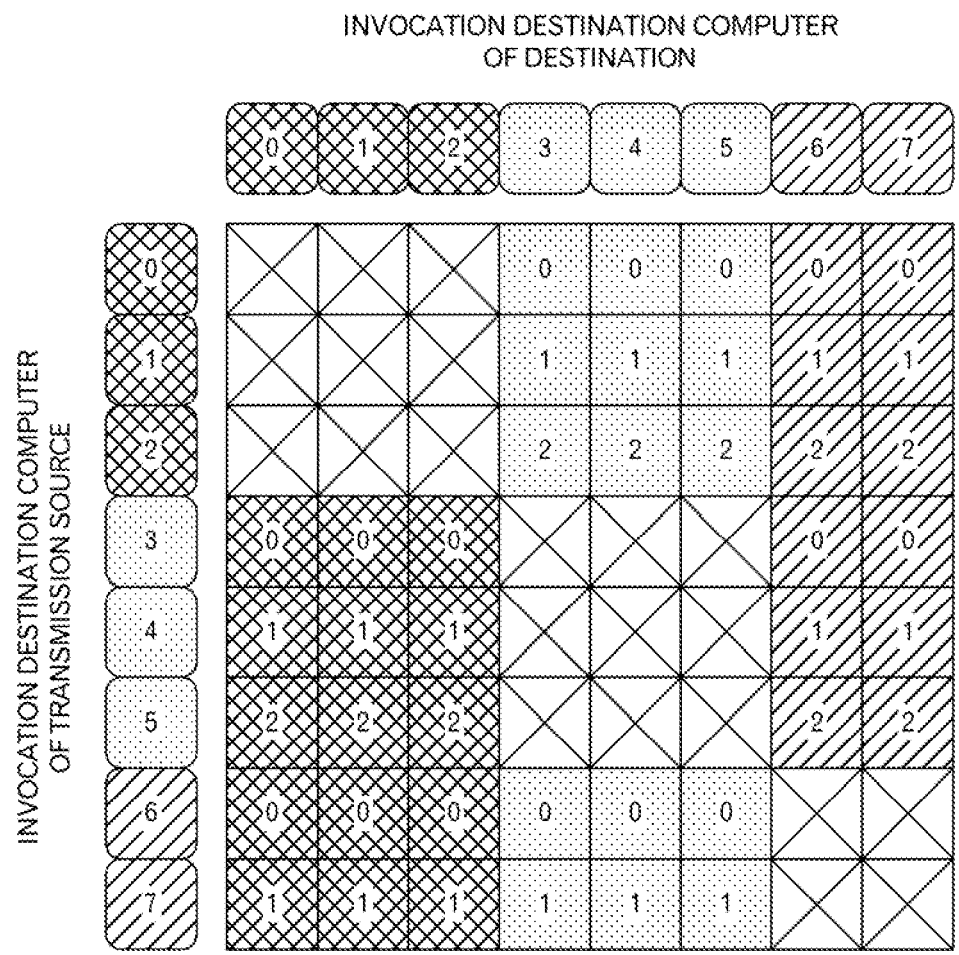
FIG. 29 is a diagram to explain an example of an initial upper-layer switch table relating to the second embodiment.

FIG. 29 illustrates an example of the initial upper-layer switch table. In an example of FIG. 29, the local computer numbers of the invocation destination computers of the transmission source are listed in the vertical direction, and the local computer numbers of the invocation destination computers of the destination are listed in the horizontal direction. When the invocation destination computer of the transmission source and invocation destination computer of the destination are connected to the same lower-layer switch, no link conflict occurs. Therefore, marks "x" are registered for the combination of the invocation destination computers connected to the same lower-layer switch. A table value rs(s, d) in portions other than that is set as follows: Incidentally, "s" represents the local computer number of the transmission source, and "d" represents the local computer number of the destination. "K" is the number of upper-layer switches. "%" represents "modulo".

$$rs(s,d)=s \% K$$

Thus, when the invocation destination computers having the local computer numbers "0" to "2" transmit data to the invocation destination computer connected to other lower-layer switches, the upper-layer switches to be used are distributed. Therefore, the link conflict hardly occurs. Similarly, when the invocation destination computers having the local computer numbers "3" to "5" transmit data to the invocation destination connected to other lower-layer switches, the upper-layer switches to be used are distributed. Therefore, the link conflict hardly occurs. Furthermore, when the invocation destination computers having the local computer numbers "6" and "7" transmit data to the invocation destination connected to other lower-layer switches, the upper-layer switches to be used are distributed. Therefore, the link conflict hardly occurs.

In the typical All-to-All communication, as explained in FIGS. 2A to 2H, while shifting the communication opponent one-by-one, the communication with all of the invocation destination computers is carried out. In this embodiment, the width for shifting the communication opponent is called "a shift distance", and the shift distance is represented by a difference between the local computer numbers. For example, in case of the communication from the local computer number "0" to the local computer number "3", the shift distance is "3".

As described above, in the typical All-to-All communication, the communications between the invocation destination computers for which a different shift distance is calculated are not carried out in the same period, and it is possible to avoid the link conflict when the communication routes between the invocation destination computers for which the same shift distance is calculated do not coincide. Therefore, for each shift distance, the upper-layer switch and LID are selected so that the communication routes between the invocation destination computers for which the same shift distance is calculated do not coincide.

However, in view of the coincidence of the communication route, not only the coincidence of the upward direction from the lower-layer switch to the upper-layer switch but also the coincidence of the downward direction from the upper-layer switch to the lower-layer switch is considered. Therefore, in FIG. 29 and subsequent drawings, based on the invocation destination computer of the destination, in other words, in the vertical direction, the cells in the table are colored differently according to the lower-layer switch connected to the invocation destination computer of the destination.

Specifically, in case of the lower-layer switch 1, cross-hatching is attached, in case of the lower-layer switch 2, dots are attached, and in case of the lower-layer switch 3, hatching from the right to the left is attached.

Figure 30:
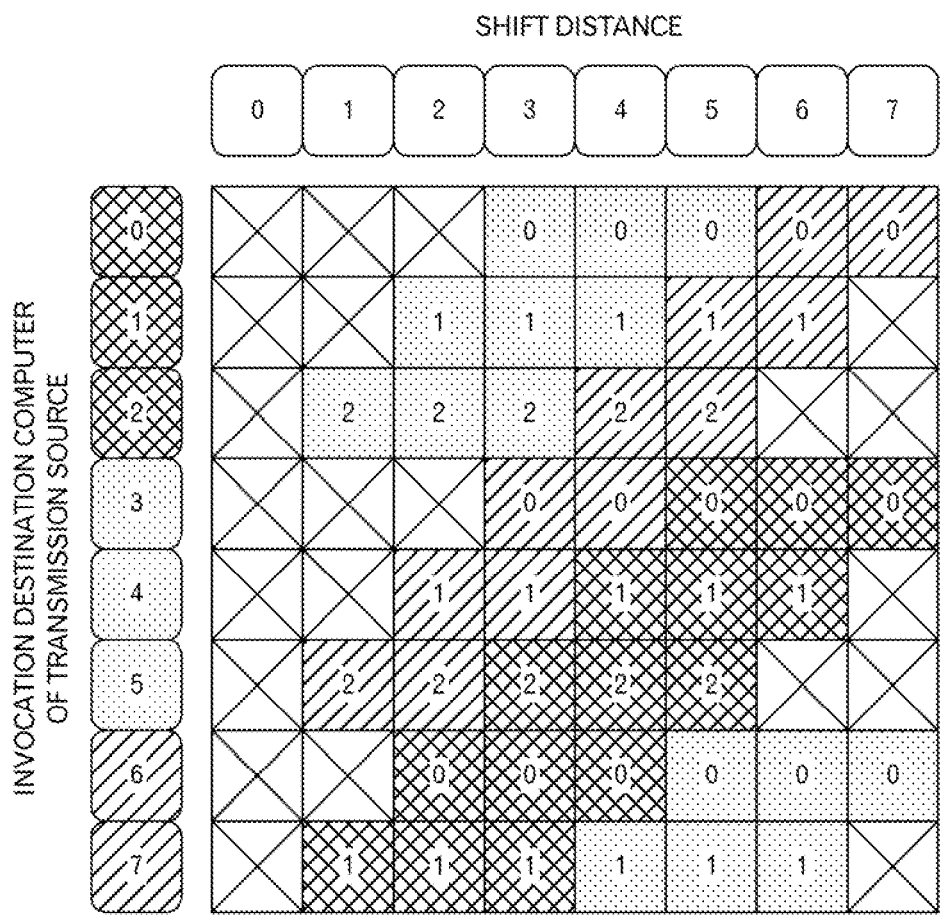
FIG. 30 is a diagram depicting an example of a shift distance table relating to the second embodiment.

Next, the initial processing unit 1121 converts the initial upper-layer switch table to a shift distance table as to the shift distance, and stores the shift distance table into the data storage area 1130 (step S207). An example of the shift distance table is illustrated in FIG. 30. In the example of FIG. 30, in the vertical direction, the local computer numbers of the invocation destination computers of the transmission source are listed, and in the horizontal direction, the shift distances are listed. Then, the shift distance table is generated from the initial upper-layer switch table rs(s, d) depicted in FIG. 29 according to the following calculation:

$$\text{Shift distance table } conv\_rs(s,sd)=rs(s,d)$$

Incidentally, "s" represents the local computer number of the invocation destination computer of the transmission source and "sd" represents the shift distance. In addition, "d" represents the local computer number of the invocation destination computer of the destination, which is calculated by the following equation:

$$d=(s+sd)\%N$$

Here, "N" represents the number of invocation destination computers.

When the initial upper-layer switch table in FIG. 29 is actually converted, the shift distance table as illustrated in FIG. 30 is obtained. The hatching and dots are moved according to the movement of the numbers.

Then, the initial processing unit 1121 carries out a table processing (step S209). The table processing is a processing to determine, for each shift distance, the numbers of the upper-layer switches while avoiding the coincidence of the communication routes between the invocation destination computers for which the same shift distance is calculated. This table processing will be explained by using FIGS. 31 to 36.

Figure 31:
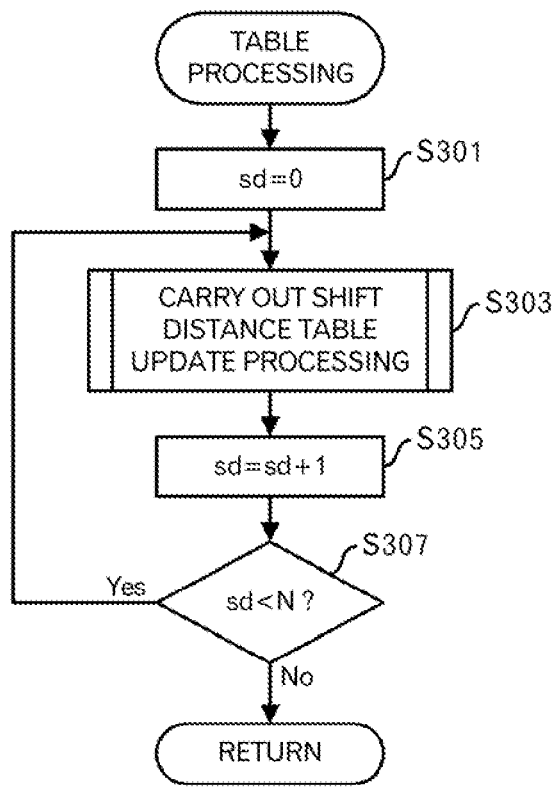
FIG. 31 is a diagram depicting a processing flow of a table processing.

First, the initial processing unit 1121 sets the shift distance sd=0 (FIG. 31: step S301). Then, the initial processing unit 1121 carries out a shift distance table update processing (step S303). This shift distance table update processing will be explained in detail later.

After that, the initial processing unit 1121 increments the shift distance sd by "1" (step S305), and determines whether or not the shift distance is less than the number N of invocation destination computers (step S307). When the shift distance sd is less than the number N of invocation destination computers, the processing returns to the step S303. On the other hand, when the shift distance sd is equal to or greater than the number N of invocation destination computers, the processing returns to the calling-source processing.

Thus, the shift distance table update processing is carried out for each shift distance to appropriately set the upper-layer switches.

Figure 32:
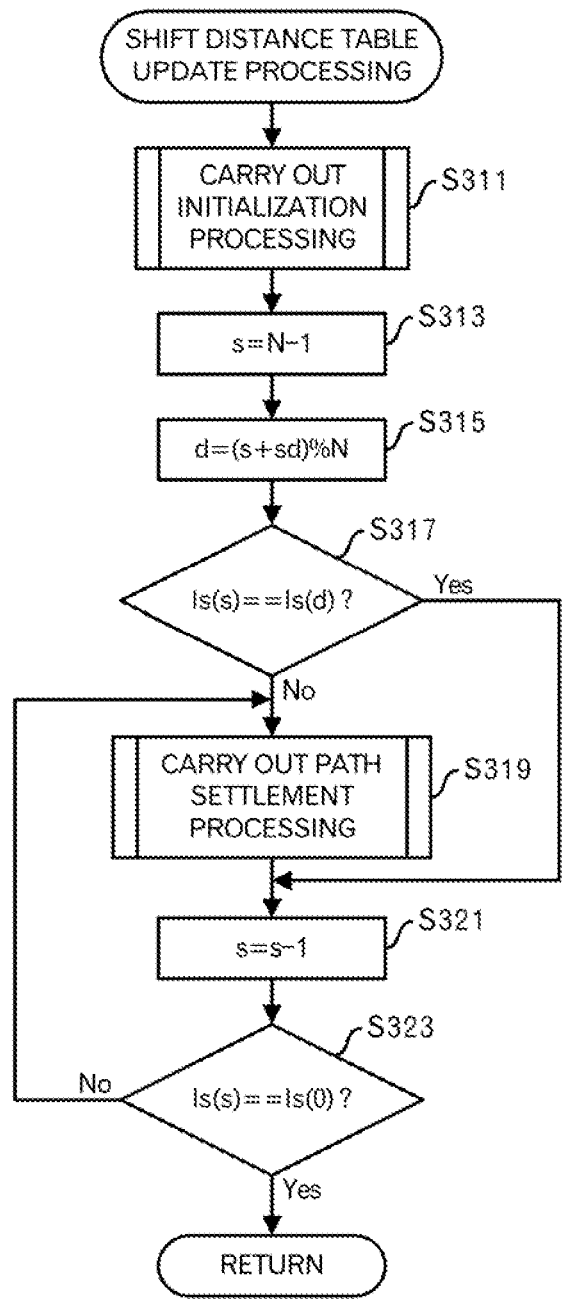
FIG. 32 is a diagram depicting a processing flow of a shift distance table update processing.

Next, the shift distance table update processing will be explained by using FIGS. 32 to 36. First, the initial processing unit 1121 carries out an initialization processing (FIG. 32: step S311). This initialization processing is explained by using FIG. 33.

Figure 33:
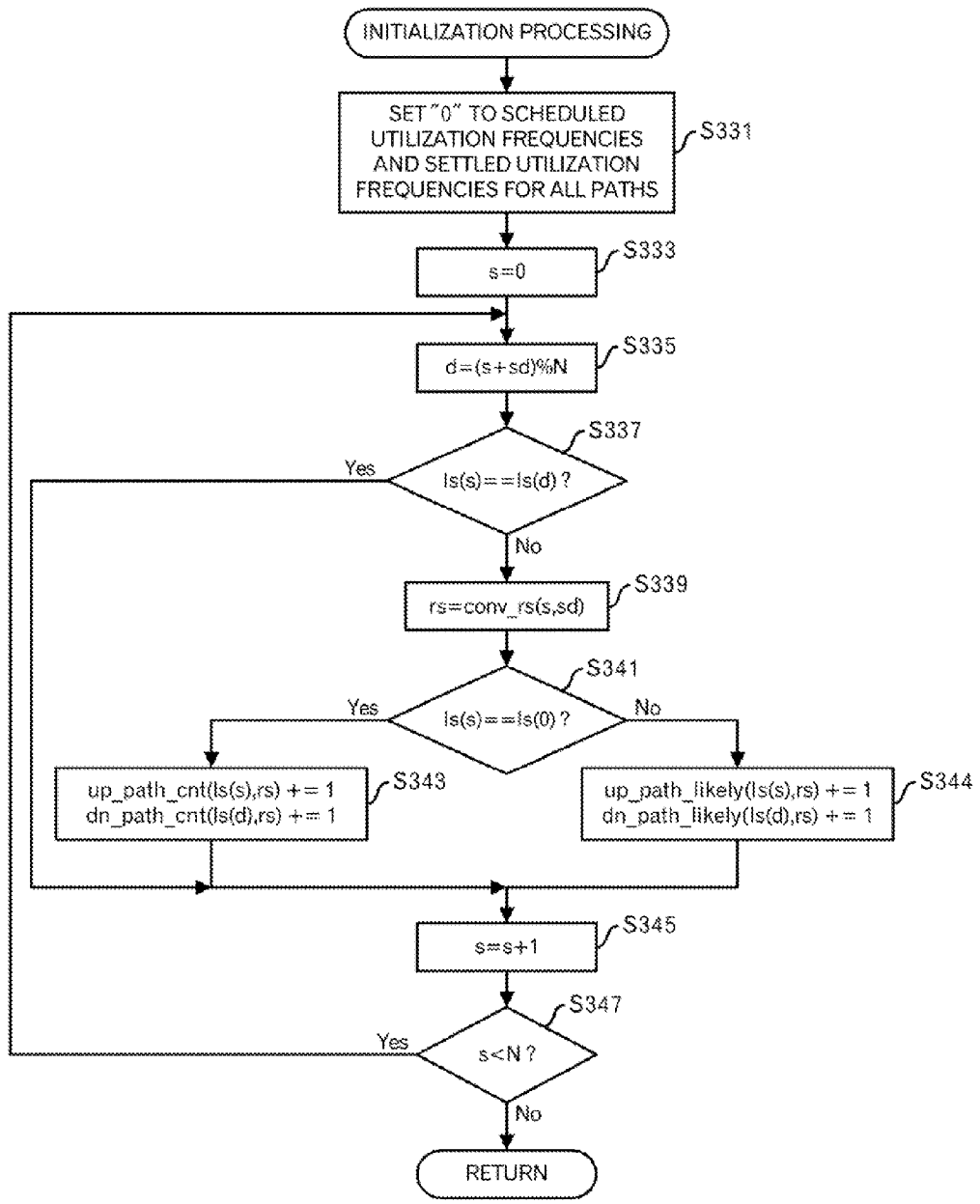
FIG. 33 is a diagram depicting a processing flow of an initialization processing.

Shifting to the explanation of the processing in FIG. 33, the initial processing unit 1121 sets 0 to scheduled utilization frequencies of the upward and downward directions and settled utilization frequencies of the upward and downward directions for all paths (step S331). Here, the scheduled utilization frequency of the upward path from the lower-layer switch "i" to the upper-layer switch "j" is represented by up_path_likely (i, j), and the scheduled utilization frequency of the downward path from the upper-layer switch "j" to the lower-layer switch "i" is represented by dn_path_likely (i, j). Here, the settled utilization frequency of the upward path from the lower-layer switch "i" to the upper-layer switch "j" is represented by up_path_cnt (i, j), and the settled utilization frequency of the downward path from the upper-layer switch "j" to the lower-layer switch "i" is represented by dn_path_cnt (i, j). At the step S331, 0 is set to all of element values of these variables.

For example, the following pseudo codes are executed.

```
for ( i = 0 ; i < N_ls ; i++ ) {
    for ( k = 0 ; k < K ; k++ ) {
        up_path_likely (i, k) = 0
        dn_path_likely (i, k) = 0
        up_path_cnt (i, k) = 0
        dn_path_cnt (i, k) = 0
    }
}
```

N_ls represents the number of lower-layer switches.

Next, the initial processing unit 1121 sets "0" to the local computer number s of the invocation destination computer of the transmission source (step S333). Furthermore, the initial processing unit 1121 sets (s+sd) % N to the local computer number d of the invocation destination computer of the destination (step S335). "sd" is set in the processing of FIG. 31.

Then, the initial processing unit 1121 determines whether or not the number ls (s) of the lower-layer switch connected to the invocation destination computer s of the transmission source is identical to the number ls (d) of the lower-layer switch connected to the invocation destination computer d of the destination (step S337). ls (i) is a function that outputs the number of the lower-layer switch connected to the invocation destination computer having the local computer number "i", and the number of the lower-layer switch is identified from data concerning the network configuration, which is stored in the data storage area 1130. At this step, it is determined whether or not the invocation destination computers of the transmission source and destination are connected to the same lower-layer switch.

When ls (s) is identical to ls(d), the processing shifts to step S345, because no consideration is required. On the other hand, when is (s) is not identical to ls(d), the initial processing unit 1121 sets a value conv_rs(s, sd) in the shift distance table to the variable rs (step S339). Namely, an identifier of the upper-layer switch identified from the invocation destination computer s of the transmission source and the shift distance sd is set to the variable rs.

Then, the initial processing unit 1121 determines whether or not the number ls(s) of the lower-layer switch connected to the invocation destination computer s of the transmission source is identical to the number ls(0) of the lower-layer switch connected to the invocation destination computer "0" (step S341). At this step, in the example of the shift distance table depicted in FIG. 30, it is determined whether or not a processing target is included in three lines from the top.

When ls(s) is identical to ls(0), the initial processing unit 1121 carries out settings as follows: (step S343).

up_path_cnt(ls(s),rs)+=1 dn_path_cnt(ls(d),rs)+=1

Namely, the settled utilization frequency of the upward path from the lower-layer switch ls(s) connected to the invocation destination computer of the transmission source to the upper-layer switch rs is incremented by "1". Similarly, the settled utilization frequency of the downward path from the upper-layer switch rs to the lower-layer switch ls(s) connected to the invocation destination computer d of the destination is incremented by "1". Then, the processing shifts to the step S345.

Thus, in the example of the shift distance table depicted in FIG. 30, the communication routes in the portion of the three lines from the top are settled. In this embodiment, when the initial upper-layer switch table is generated, the upper-layer switches are distributed. Therefore, there is no problem, even when such settlement is carried out. In addition, the processing can be completed at high-speed.

On the other hand, when is (s) is not identical to is the initial processing unit 1121 carries out settings as follows: (step S344).

up_path_likely(ls(s),rs)+=1 dn_path_likely(ls(d),rs)+=1

Namely, the scheduled utilization frequency of the upward path from the lower-layer switch ls(s) connected to the invocation destination computer of the transmission source to the upper-layer switch rs is incremented by "1". Similarly, the scheduled utilization frequency of the downward path from the upper-layer switch rs to the lower-layer switch ls(d) connected to the invocation destination computer d of the destination is incremented by "1". Then, the processing shifts to the step S345.

After that, the initial processing unit 1121 increments the local computer number s of the invocation destination computer of the transmission source by "1" (step S345), and determines whether or not s is less than the number N of invocation destination computers (step S347). When s is less than N, the processing returns to the step S335. On the other hand, when s is equal to or greater than N, the processing returns to the calling-source processing.

By carrying out this initialization processing, the processing can be completed at high-speed.

Returning to the explanation of the processing in FIG. 32, the initial processing unit 1121 sets N−1 to the local computer number s of the invocation destination computer of the transmission source (step S313). Because the three lines from the top in the shift distance table in FIG. 30 are settled in the initialization processing, the processing reversely proceeds from the bottom of the shift distance table in the following processing.

Then, the initial processing unit 1121 sets (s+sd) % N to the local computer number d of the invocation destination computer of the destination (step S315). Then, the initial processing unit 1121 determines whether or not the number ls (s) of the lower-layer switch connected to the invocation destination computer s of the transmission source is identical to the number ls(d) of the lower-layer switch connected to the invocation destination computer d of the destination (step S317). When ls(s) is identical to ls(d), there is no need to carry out the processing. Therefore, the processing shifts to step S321.

On the other hand, when ls (s) is not identical to ls(d), the initial processing unit 1121 carries out a path settlement processing (step S319). The path settlement processing will be explained later by using FIGS. 34 to 36.

When the path settlement processing is carried out, the initial processing unit 1121 decrements s by "1" (step S321), and determines whether or not the lower-layer switch ls(s) connected to the invocation destination computer s of the transmission source is identical to the lower-layer switch ls(0) connected to the invocation destination computer "0" (step S323).

When ls(s) is identical to ls(0), the path is settled in the initialization processing (step S311). Therefore, the processing returns to the calling-source processing. On the other hand, when ls(s) is not identical to ls(0), the processing returns to the step S319.

By carrying out such a processing, the settlement of the paths is carried out while avoiding the coincidence of the communication routes.

Figure 34:
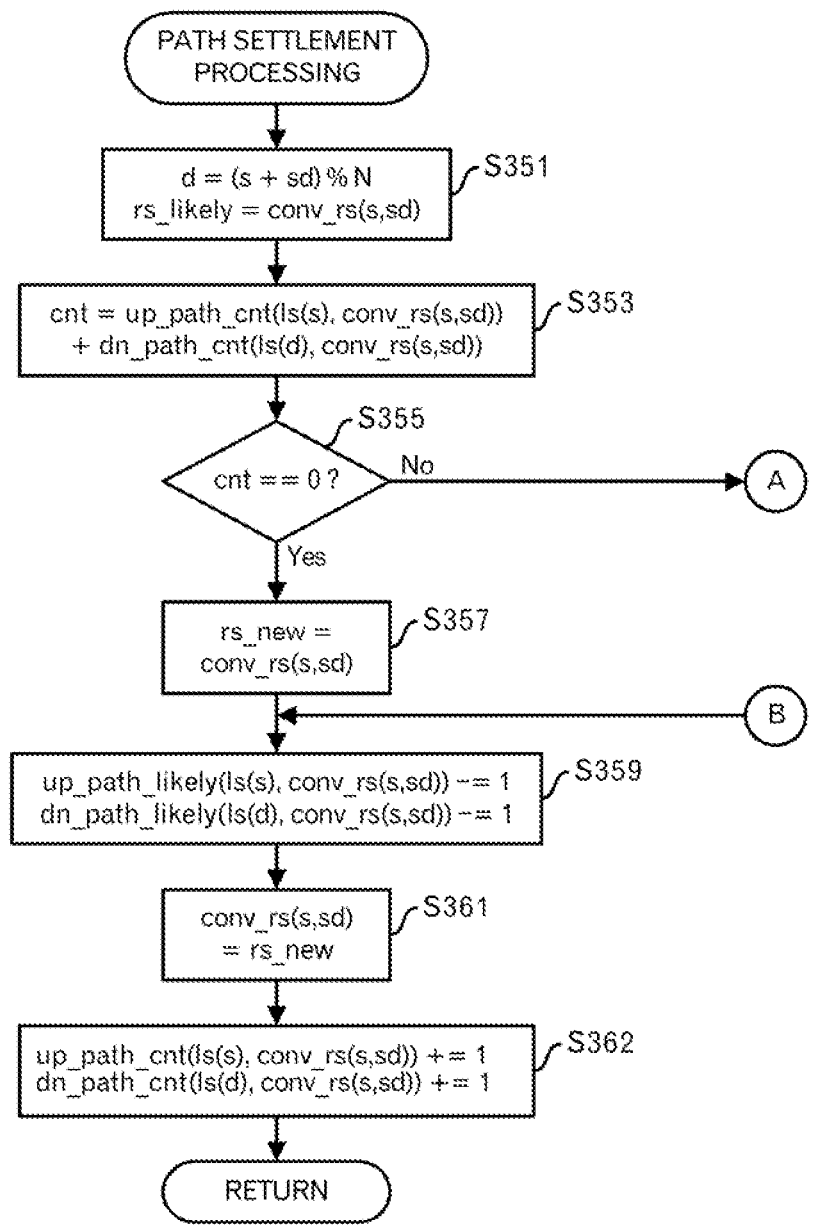
FIG. 34 is a diagram depicting a processing flow of a path settlement processing.

Next, the path settlement processing will be explained by using FIGS. 34 to 36.

The initial processing unit 1121 calculates the local computer number d of the invocation destination computer of the destination by (s+sd) % N, and sets the value conv_rs (s, sd) of the shift distance table, which is a present consideration target, to a variable rs_likely (step S351). In addition, the initial processing unit 1121 carries out the following calculation in order to confirm the settled utilization frequencies of the upward and downward direction for the communication route, which is a present consideration target, is "0", in other words to confirm the path has not been settled (step S353).

$$cnt=up\_path\_cnt(ls(s),conv\_rs(s,sd))+dn\_path\_cnt(ls(d),conv\_rs(s,sd))$$

Then, the initial processing unit 1121 determines whether or not cnt is equal to "0" (step S355). When cnt is not equal to "0", it represents the settled paths exist for the upward direction or downward direction or both of them. Therefore, the processing shifts to a processing of FIG. 35 through a terminal A.

On the other hand, when cnt is equal to "0", the initial processing unit 1121 sets the value conv_rs(s, sd) of the present shift distance table to a variable rs_new (step S357). This processing is to temporarily evacuate conv_rs(s, sd) to rs_new in relation to the processing of FIG. 35. Then, the initial processing unit 1121 decreases the scheduled utilization frequency as follows: (step S359).

$$up\_path\_likely(ls(s),conv\_rs(s,sd))-=1$$

$$dn\_path\_likely(ls(d),conv\_rs(s,sd))-=1$$

Furthermore, the initial processing unit 1121 sets the value of the variable rs_new to an element conv_rs (s, sd), which is a present consideration target, in the shift distance table (step S361). By this processing, the path, which is the present consideration target, is settled. Incidentally, this step is carried out in relation to the processing of FIG. 35.

Then, the initial processing unit 1121 reflects the settlement of the path to the settled utilization frequency as follows: (step S362). Then, the processing returns to the calling-source processing.

$$up\_path\_cnt(ls(s),conv\_rs(s,sd))+=1$$

$$dn\_path\_cnt(ls(d),conv\_rs(s,sd))+=1$$

Figure 35:
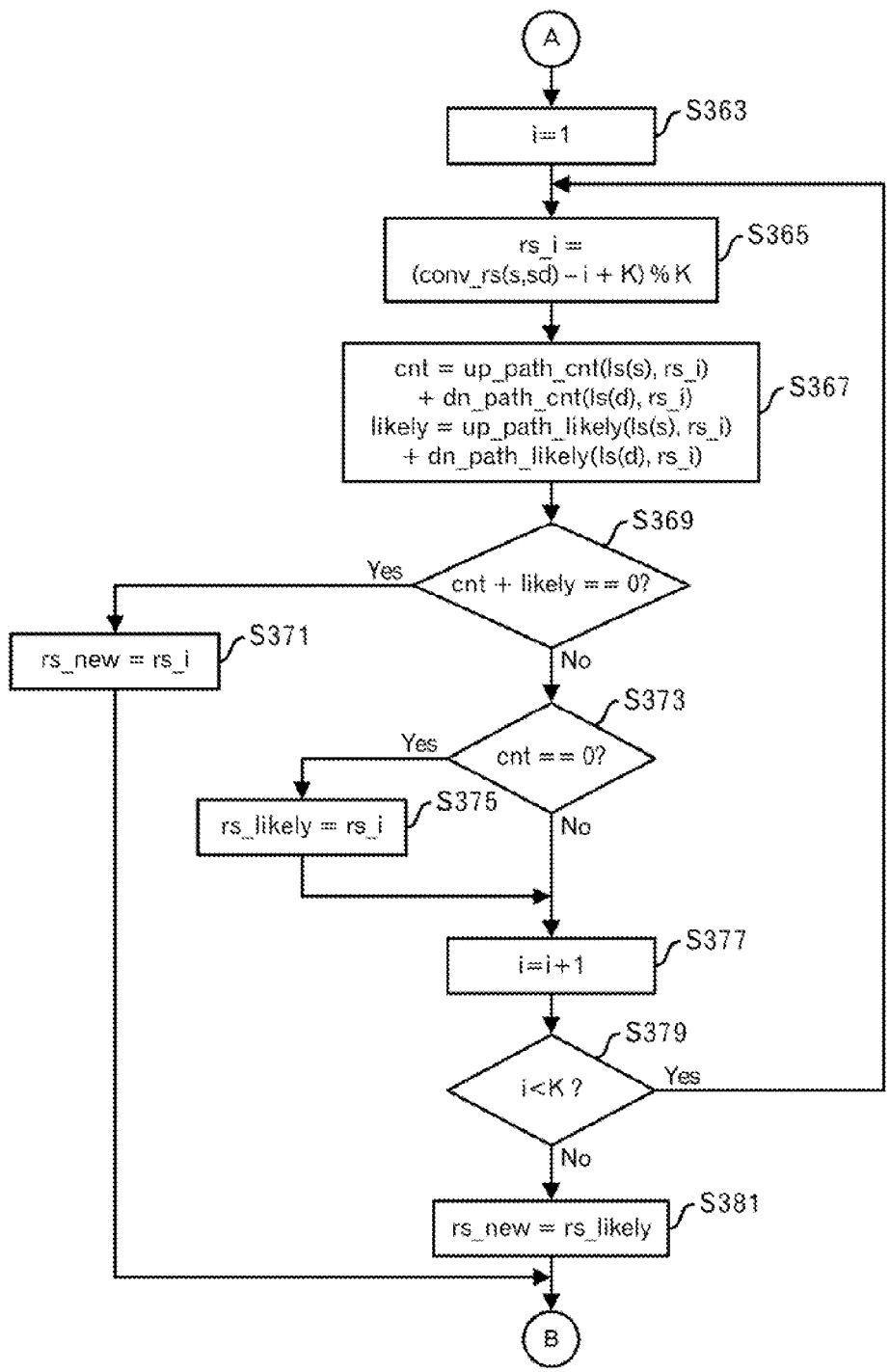
FIG. 35 is a diagram depicting a processing flow of the path settlement processing.

Next, the processing of FIG. 35 is explained. In this processing, a search is carried out in order to avoid the settled path as much as possible. First, the initial processing unit 1121 sets "1" to "i" (step S363). Then, the initial processing unit 1121 substitutes (conv_rs (s, sd)−i+K) % K to a variable rs_i (step S365). Here, the identifier of the upper-layer switch different from conv_rs(s, sd) is set to the variable rs_i.

After that, the initial processing unit 1121 confirms a settlement state of the path by carrying out the following calculations, based on this rs_i (step S367).

$$cnt=up\_path\_cnt(ls(s),rs\_i)+dn\_path\_cnt(ls(d),rs\_i)$$

$$likely=up\_path\_likely(ls(s),rs\_i)+dn\_path\_likely(ls(d),rs\_i)$$

Then, the initial processing unit 1121 confirms whether or not cnt+likely is equal to "0" (step S369). Then, when cnt+likely is equal to "0", in other words, after the upper-layer switch is changed, it is confirmed that a path exists, for which no settled utilization and no scheduled utilization is set, the initial processing unit 1121 sets a value of rs_i to rs_new (step S371), and the processing returns to the step S359 of FIG. 34 through a terminal B.

On the other hand, when cnt+likely is not equal to "0", the initial processing unit 1121 confirms whether or not cnt is equal to "0" (step S373). It is confirmed whether or not the settlement is made, although the scheduled utilization is set. When cnt is equal to "0", the initial processing unit 1121 sets, as a candidate, rs_i to the variable rs_likely (step S375), and the processing shifts to step S377. On the other hand, when cnt is not equal to "0", in other words, when the settled utilization is registered, the initial processing unit 1121 increments the counter "i" by "1" (step S377), and determines whether or not "i" is less than "K" (step S379). When "i" is less than "K", the processing returns to the step S365, and the aforementioned processing is repeated. On the other hand, when "i" is equal to or greater than "K", the initial processing unit 1121 sets the present value rs_likely to rs_new (step S381). Incidentally, because an initial setting value is set to rs_likely at the step S351, this initial setting value is set to rs_new even when an appropriate upper-layer switch is not found in the aforementioned processing. After this, the processing returns to the step S359 through the terminal B.

By carrying out such a processing, the coincidence of the communication routes is avoided.

Figure 36:
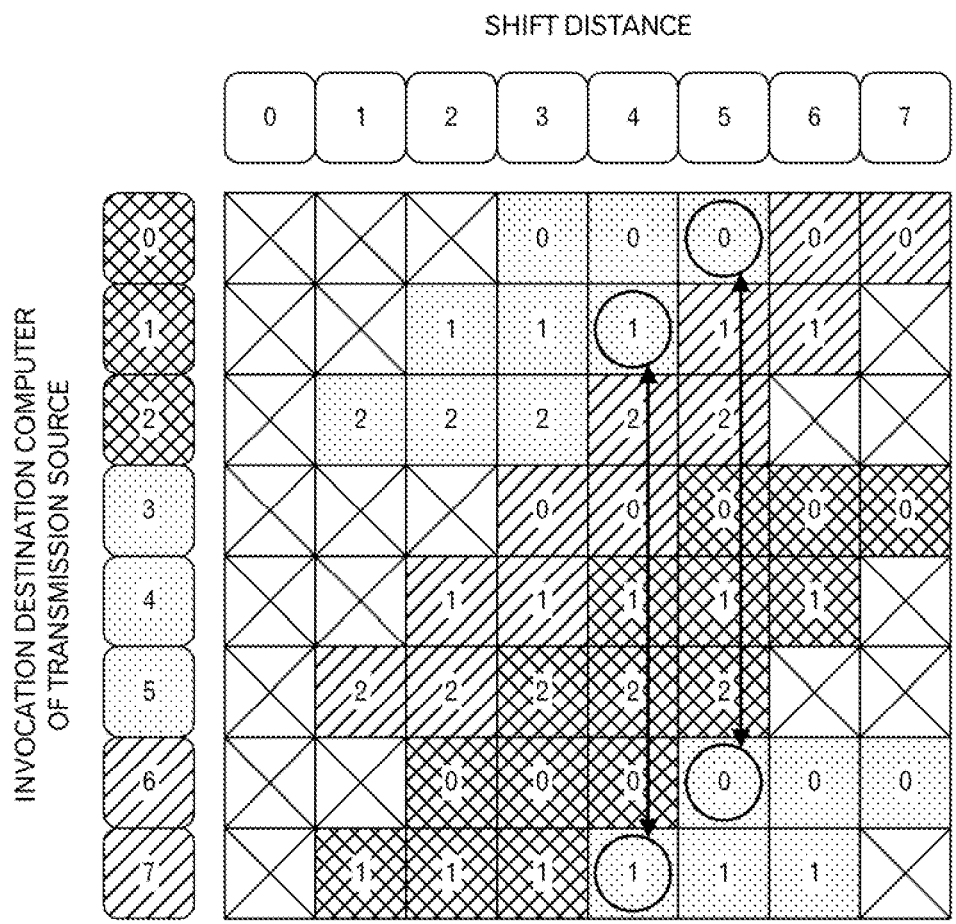
FIG. 36 is a diagram to explain a processing to avoid coincidence of communication routes.
Figure 37:
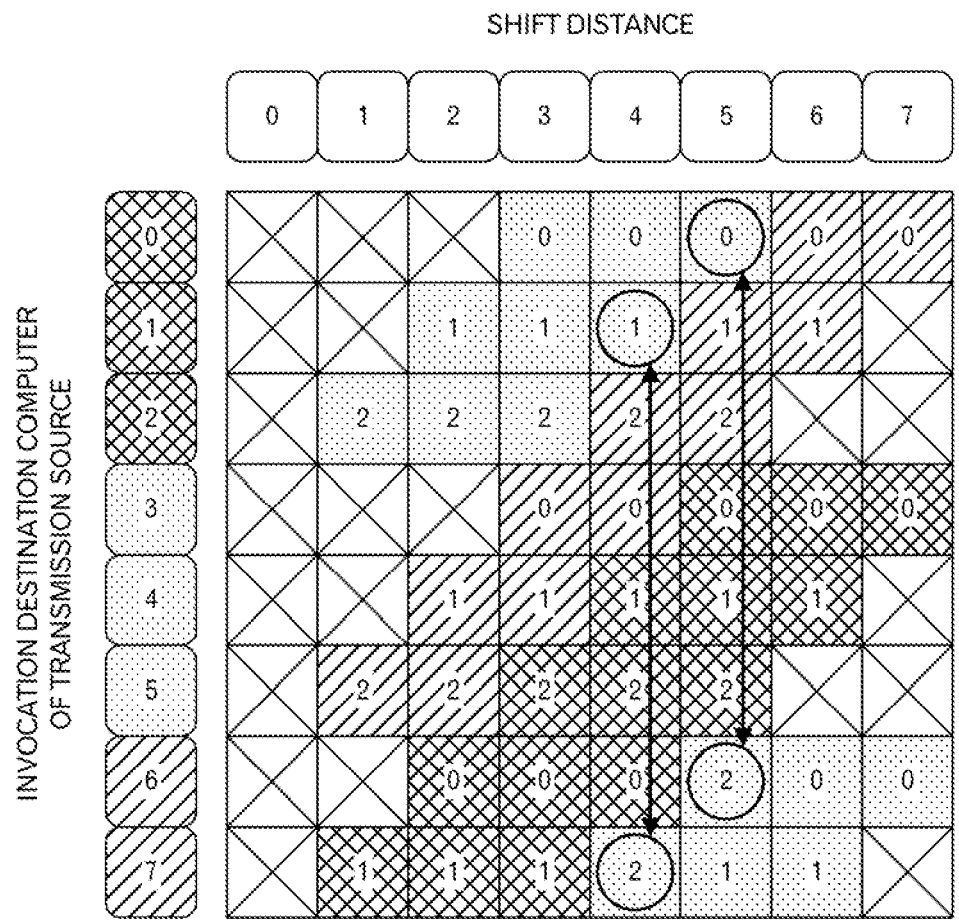
FIG. 37 is a diagram depicting the shift distance table.
Figure 38:
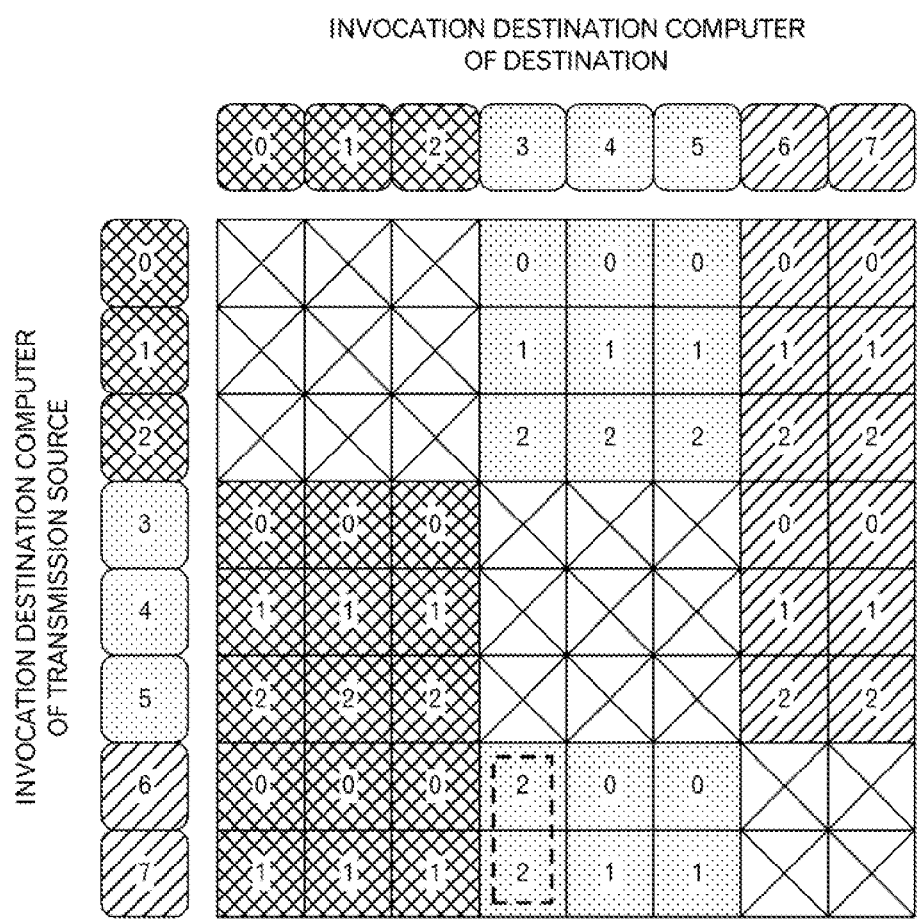
FIG. 38 is a diagram depicting an example of an updated shift distance table.

The aforementioned processing is schematically explained by using FIG. 36. As explained above, for each shift distance, the coincidence of the communication routes between the invocation destination computers for which the same shift distance is calculated is avoided. Therefore, in the shift distance table in FIG. 36, it is confirmed whether or not the coincidence exists in the vertical direction. However, when the initial upper-layer switch is generated, the upper-layer switches are distributed in the vertical direction. Therefore, the coincidence in the upward direction is avoided. On the other hand, the coincidence in the downward direction is determined by a combination of the identifier of the upper-layer switch and a type of hatching. In an example of FIG. 36, in case of the shift distance "4", the downward communication route for the invocation destination computer "1" of the transmission source and the downward communication route for the invocation destination computer "7" of the transmission source coincide. Similarly, in case of the shift distance "5", the downward communication route for the invocation destination computer "0" of the transmission source and the downward communication route for the invocation destination computer "6" of the transmission source coincide. As for these portions, changes of the communication routes are carried out. As described above, the communication routes relating to the lower-layer switch 1 were settled with priority. Therefore, the upper-layer switch for the invocation destination computer connected to other lower-layer switches is changed. As depicted in FIG. 37, when the upper-layer switch of the invocation destination computer "6" in case of the shift distance "5" is changed to "2", the coincidence can be avoided. Moreover, when the upper-layer switch of the invocation destination computer "7" in case of the shift distance "4" is changed to "2", the coincidence can be avoided. Such a processing is realized by the aforementioned processing flow.

Returning to the explanation of the processing in FIG. 27, the initial processing unit 1121 converts the shift distance table settled at the step S209 to a final upper-layer switch table (step S211). Specifically, the following calculation is carried out.

$$rs(s,d) = conv\_rs(s,sd)$$

Here, d=(s+sd) % N. This is an inverse conversion of the step S207, and FIG. 37 is converted into FIG. 38. The portion surrounded by the thick dotted line is changed from the initial upper-layer switch table.

After that, the initial processing unit 1121 sets LIDs for combinations of the invocation destination computers, which are other than combinations of the same invocation destination computers, in the final upper-layer switch table, according to associations between the identifiers of the computers and the local computer numbers and the LID file (step S213). In this embodiment, by carrying out the following calculation, LIDs are set to the final upper-layer switch table lid(s, d).

$$lid(s,d) = first\_LID(server\_id(d)) + rs(s,d)$$

Figure 39:
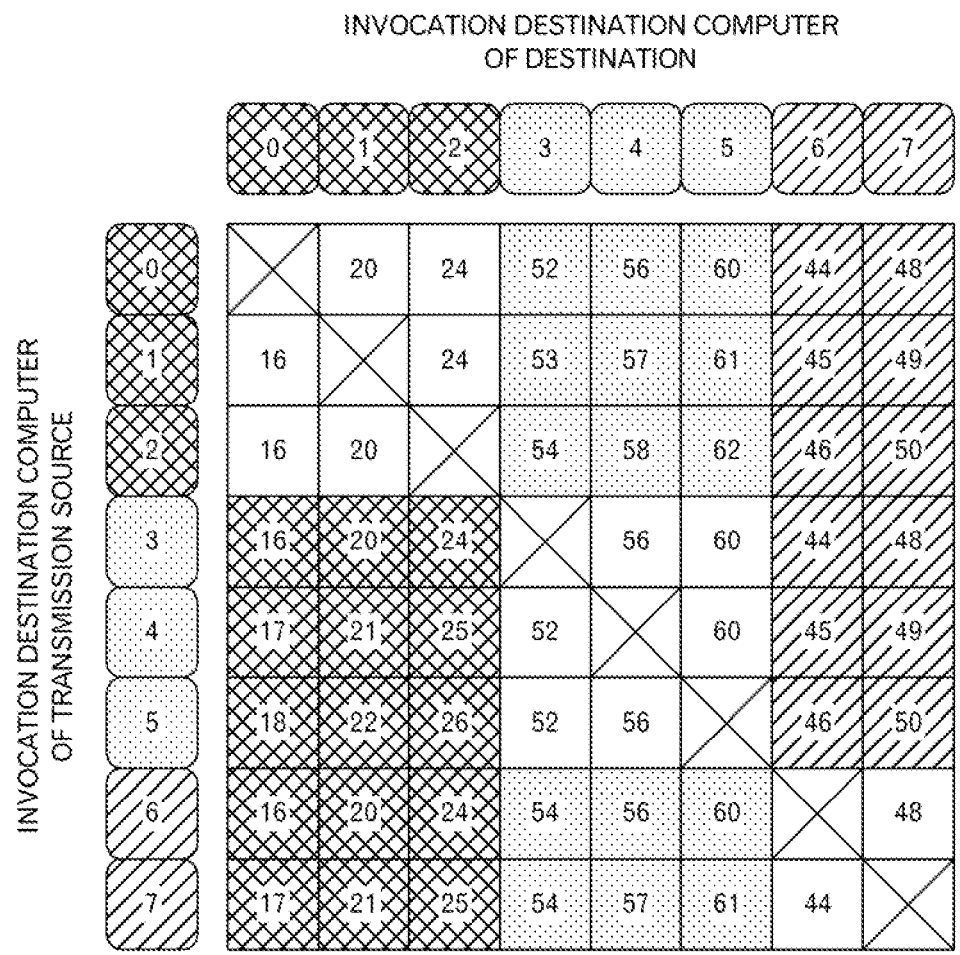
FIG. 39 is a diagram depicting an example of a final upper-layer switch table.

Here, server_id(d) is a function outputting a computer identifier of the local computer number d. Moreover, first_LID(x) is a first LID of the computer x. FIG. 39 illustrates an example of the processing result. Incidentally, when the invocation destination computers of the transmission source and destination are connected to the same lower-layer switch, these LIDs are mere examples.

Then, the initial processing unit 1121 extracts data for its own invocation destination computer from the final upper-layer switch table to generate a second association table, and stores the second association table into the data storage area 1130 (step S215).

Figures 40, 41:
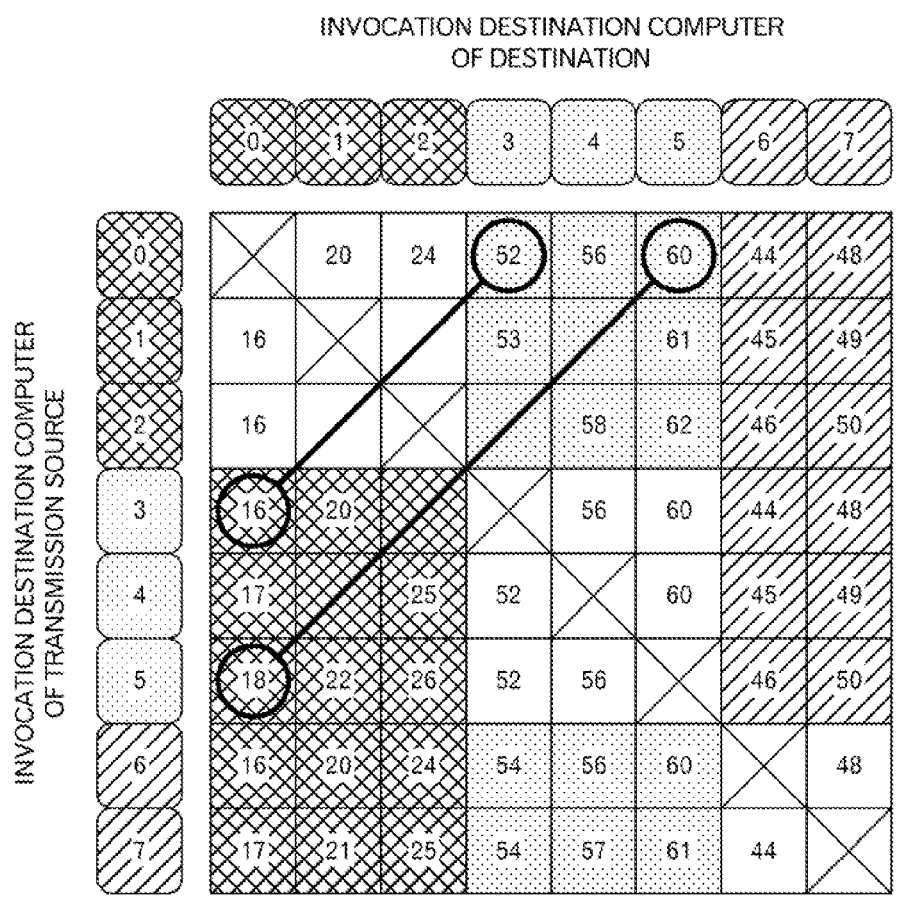
FIG. 40 is a diagram depicting a second association table relating to the second embodiment.
FIG. 41 is a diagram to explain an allocation state of the LIDs relating to the second embodiment.

For example, when its own process is invoked on the invocation destination computer having the identifier "comp05" and local computer number "2", the third line in FIG. 39 is extracted and the second association table as depicted in FIG. 40 is generated. In an example of FIG. 40, the identifier of the process, identifier of the invocation destination computer and LID are associated. Thus, even when the communication with any other process or invocation destination computer is carried out, it is possible to identify the LID to be used.

The aforementioned processing is carried out in parallel in each invocation destination computer.

Then, the initial processing unit 1121 constructs the communication connections between the processes according to the second association table generated at the step S215 (step S217). This processing itself is the same as the conventional method. Therefore, further explanation is omitted.

However, as illustrated in FIG. 41, when the communication between the invocation destination computer A having the local computer number "0" and the invocation destination computer B having the local computer number "3" is carried out, the invocation destination computer A transmits data addressed to lid(0, 3)=52. However, the invocation destination computer B transmits data addressed to lid(3, 0)=16. On the other hand, when the communication between the invocation destination computer A having the local computer number "0" and the invocation destination computer B having the local computer number "5" is carried out, the invocation destination computer A transmits data addressed to lid(0, 5)=60. However, the invocation destination computer B transmits data addressed to lid(5, 0)=18. Namely, even when data is transmitted to the same destination, LIDs to be used are different.

Figure 42:
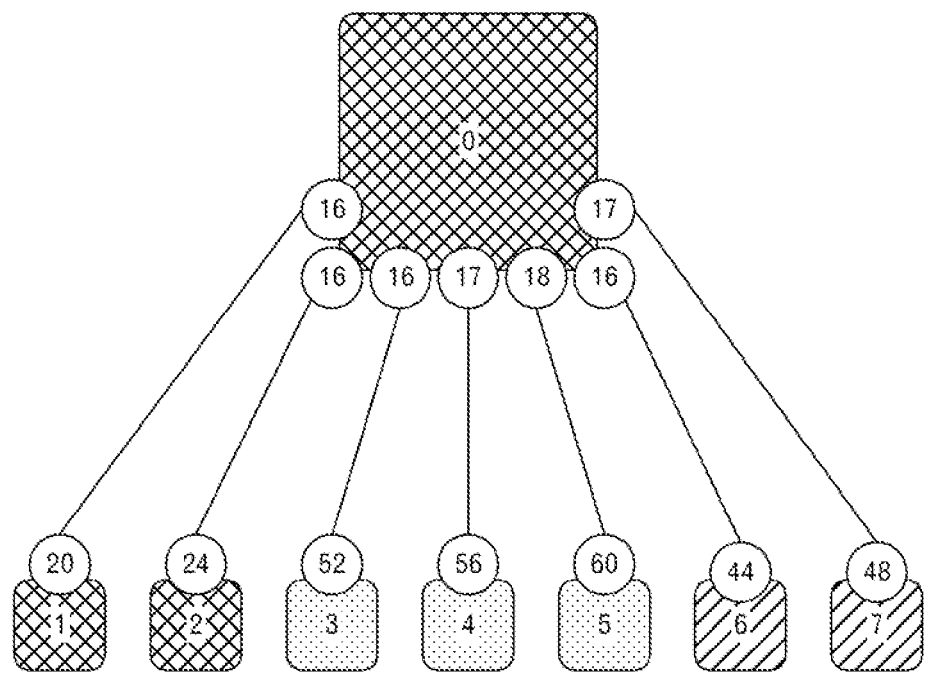
FIG. 42 is a diagram to explain the allocation state of the LIDs relating to the second embodiment.

As schematically depicted in FIG. 42, when the invocation destination computer having the local computer number "0" is mainly considered, any one of LIDs "16", "17" and "18" is used when viewed from other invocation destination computers, and it is completely different from the conventional technique that an LID selected from plural LIDs is fixedly used.

By carrying out such a processing, preparation for communicating with parallel processes on other invocation destination computers is completed.

Then, returning to the explanation of the processing in FIG. 26, the parallel process 1110 carries out the interprocess communication using the communication connections constructed at the step S217 according to the program (step S103). This interprocess communication may be All-to-All communication by the All-to-All communication unit 1123, or may be peer-to-peer communication. The step S103 is carried out until the processing of the parallel process 1110 is completed.

By carrying out such a processing, the communication performance can be enhanced, because the link conflict is avoided.

Figure 1:
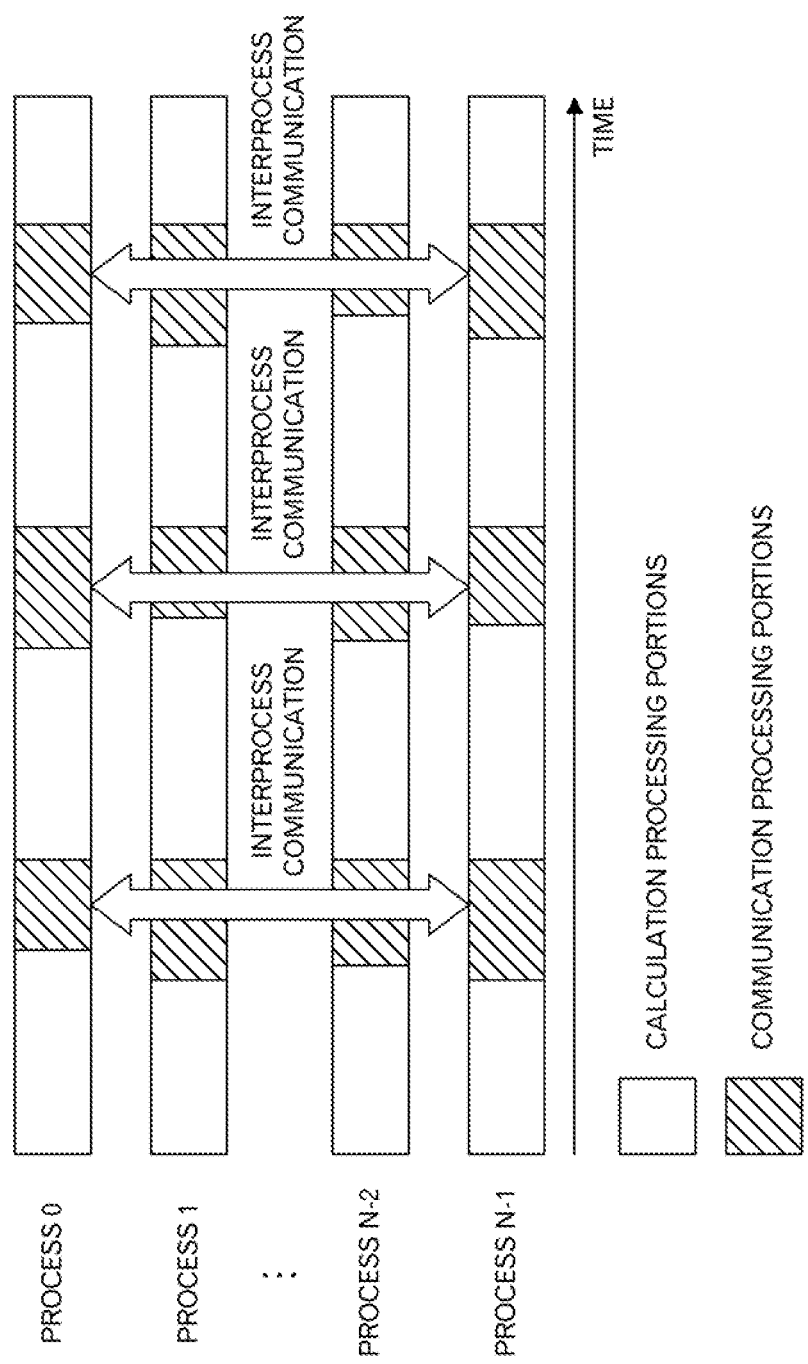
FIG. 1 is a diagram to explain interprocess communication.
Figure 2A:
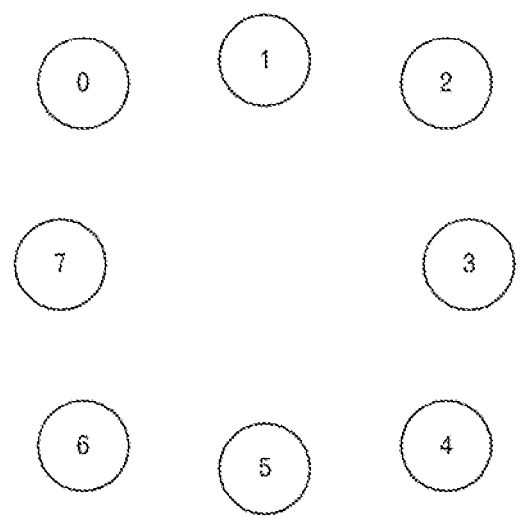
FIG. 2A is a diagram to explain a Ring algorithm.
Figure 2B:
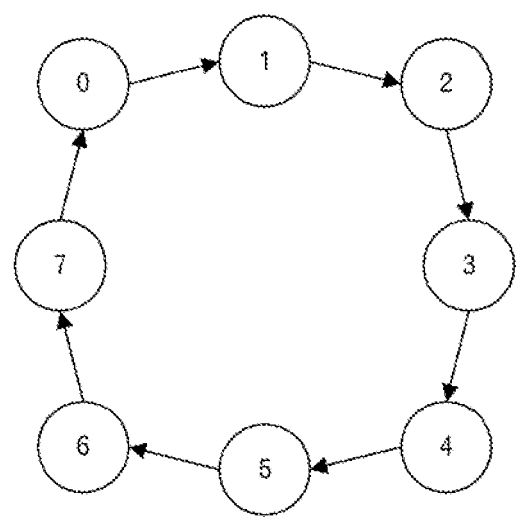
FIG. 2B is a diagram to explain the Ring algorithm.
Figure 2C:
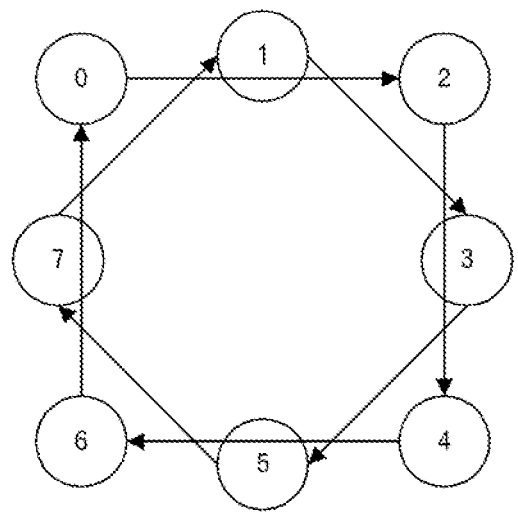
FIG. 2C is a diagram to explain the Ring algorithm.
Figure 2D:
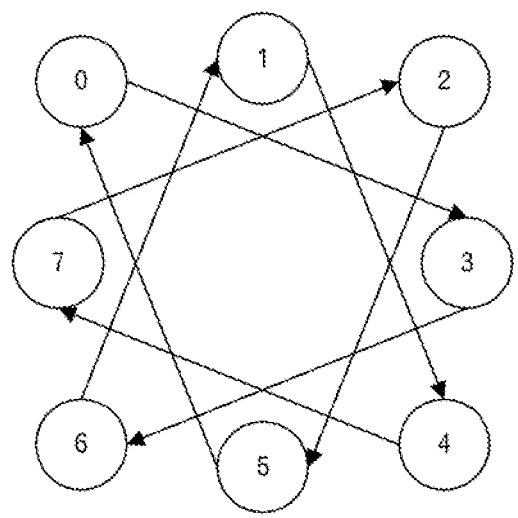
FIG. 2D is a diagram to explain the Ring algorithm.
Figure 2E:
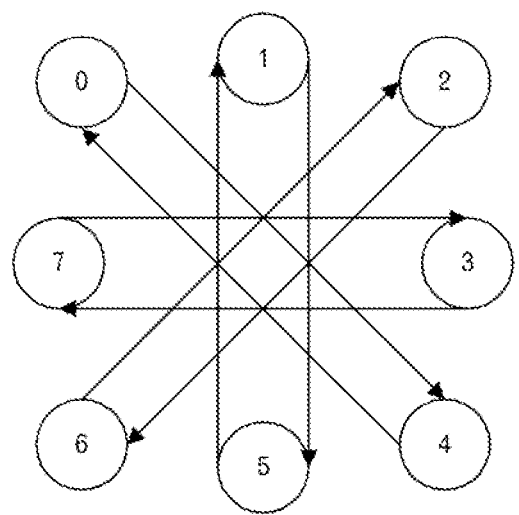
FIG. 2E is a diagram to explain the Ring algorithm.
Figure 2F:
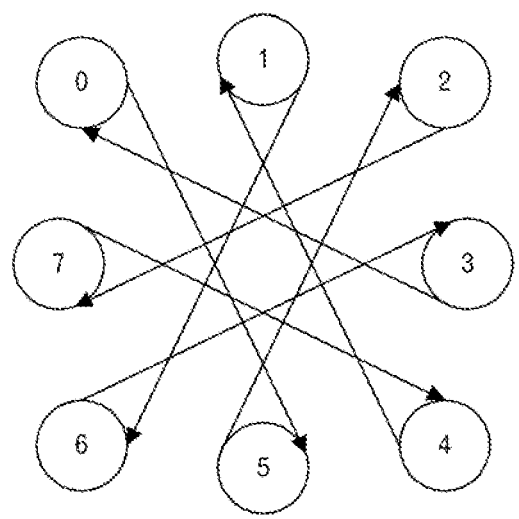
FIG. 2F is a diagram to explain the Ring algorithm.
Figure 2G:
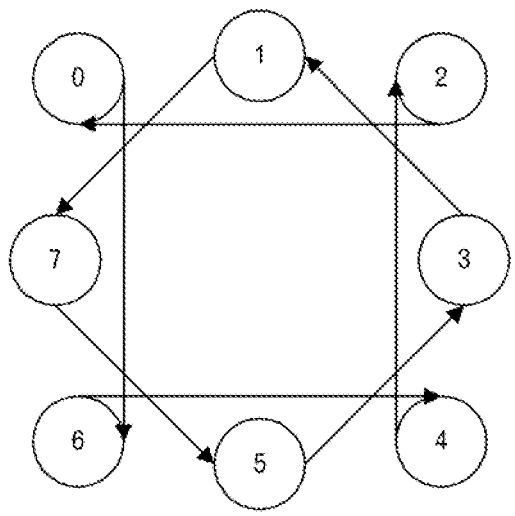
FIG. 2G is a diagram to explain the Ring algorithm.
Figure 2H:
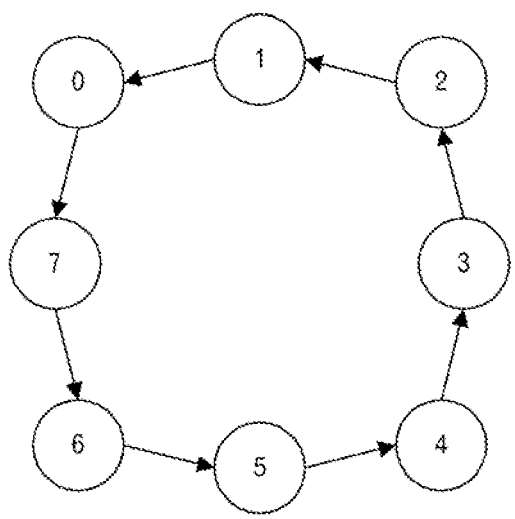
FIG. 2H is a diagram to explain the Ring algorithm.
Figure 3:
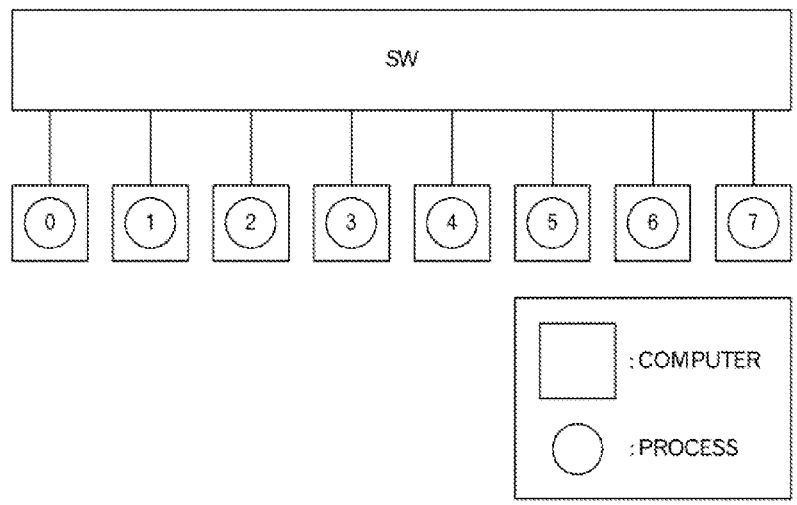
FIG. 3 is a diagram depicting an example of a network configuration.
Figure 4:
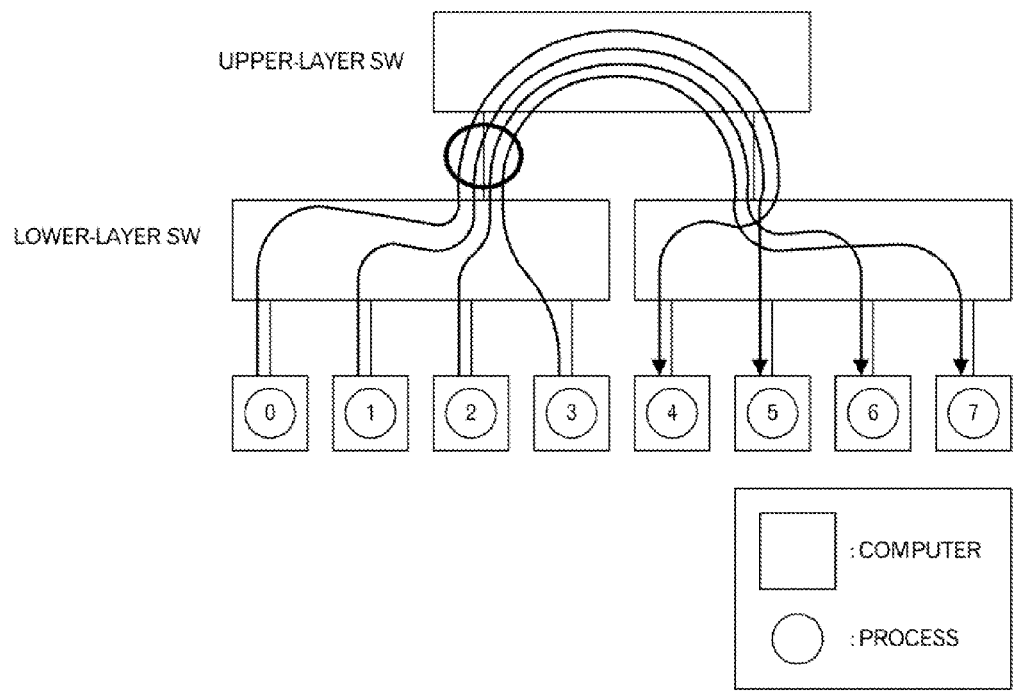
FIG. 4 is a diagram depicting an example of a network configuration.
Figure 5:
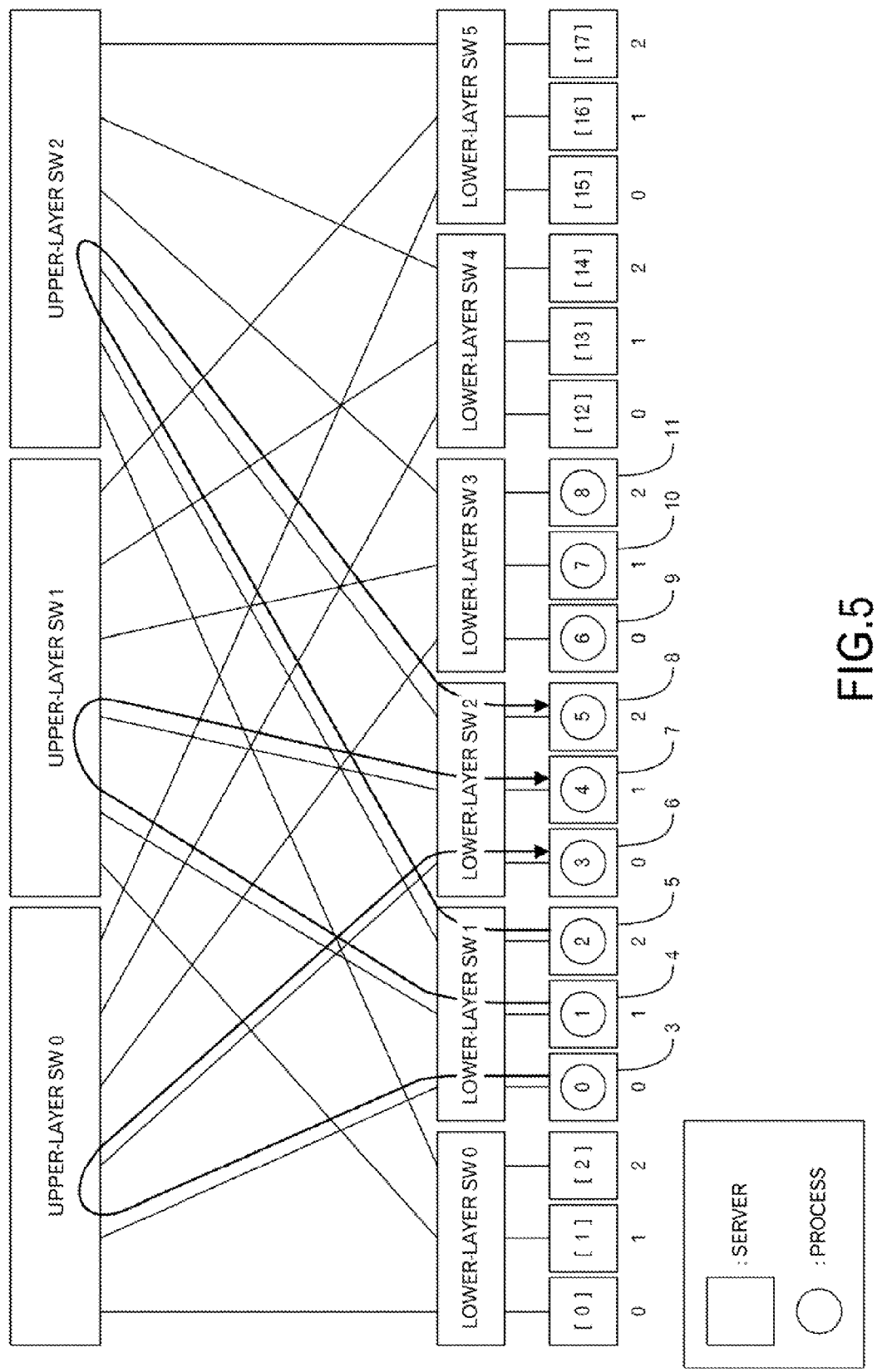
FIG. 5 is a diagram to explain All-to-All communication in a Fat-tree network.
Figure 6:
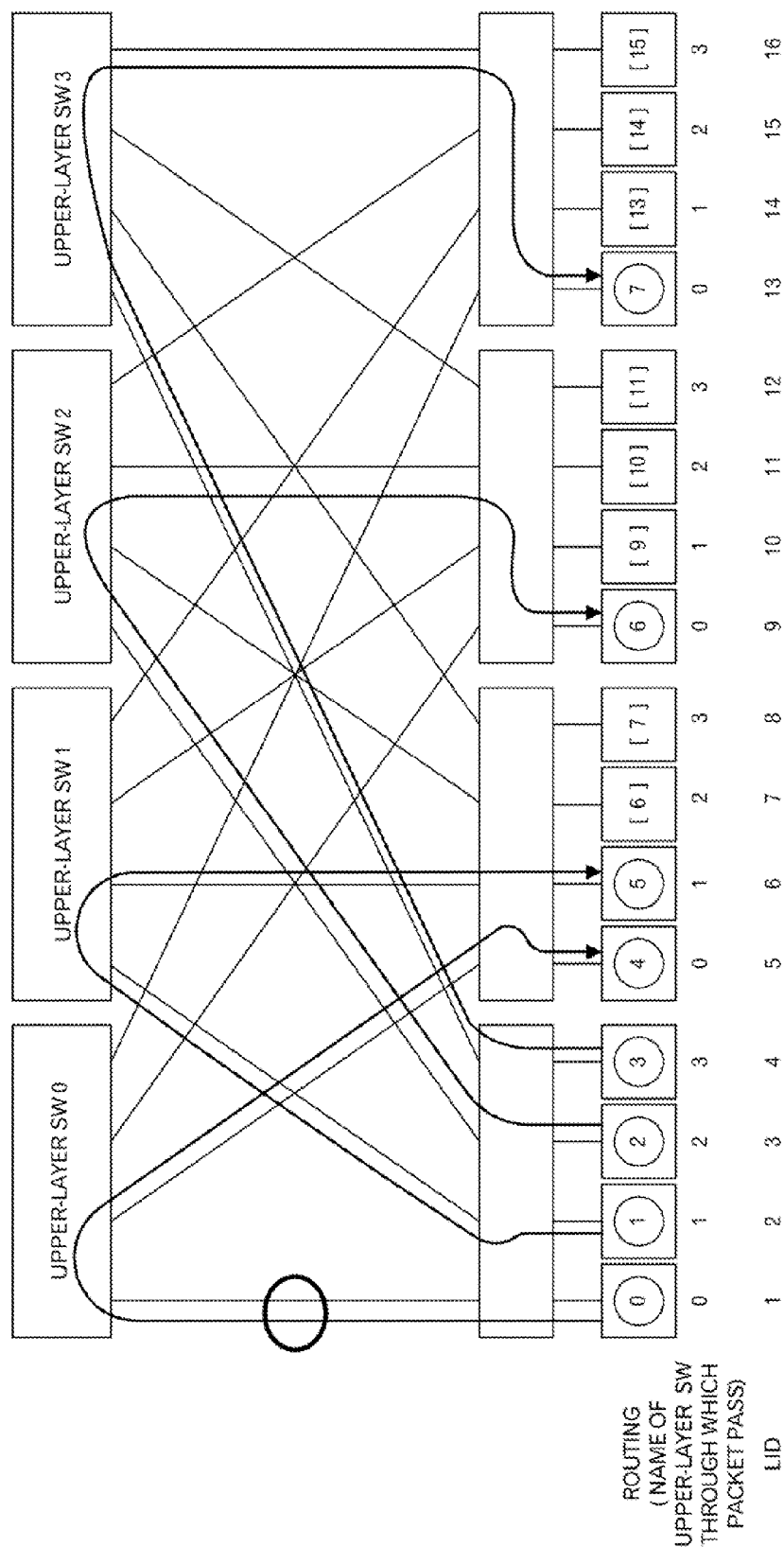
FIG. 6 is a diagram depicting an example when the link conflict occurs in the Fat-tree network.
Figure 7:
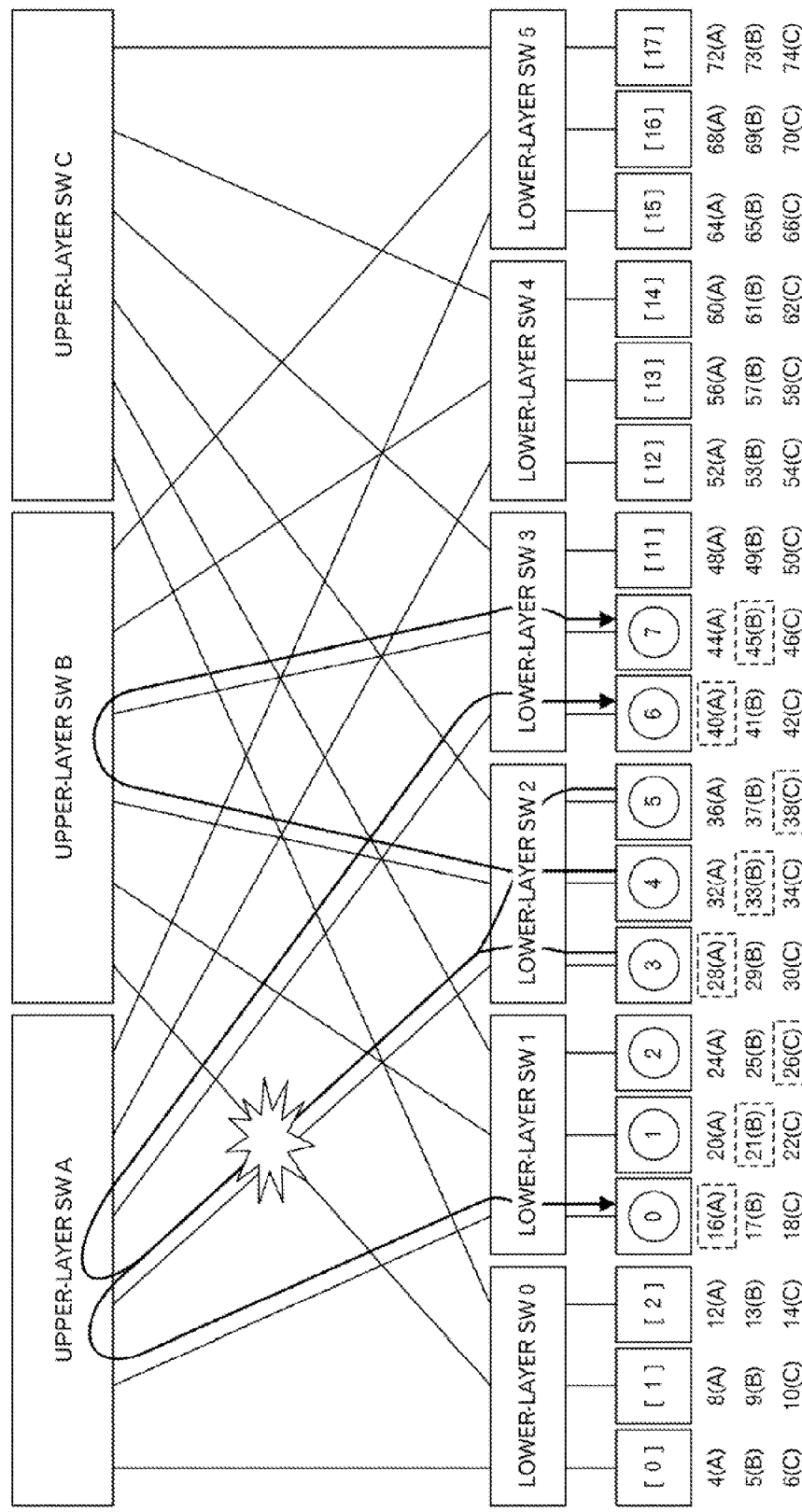
FIG. 7 is a diagram to explain a problem in a conventional technique.
Figure 43:
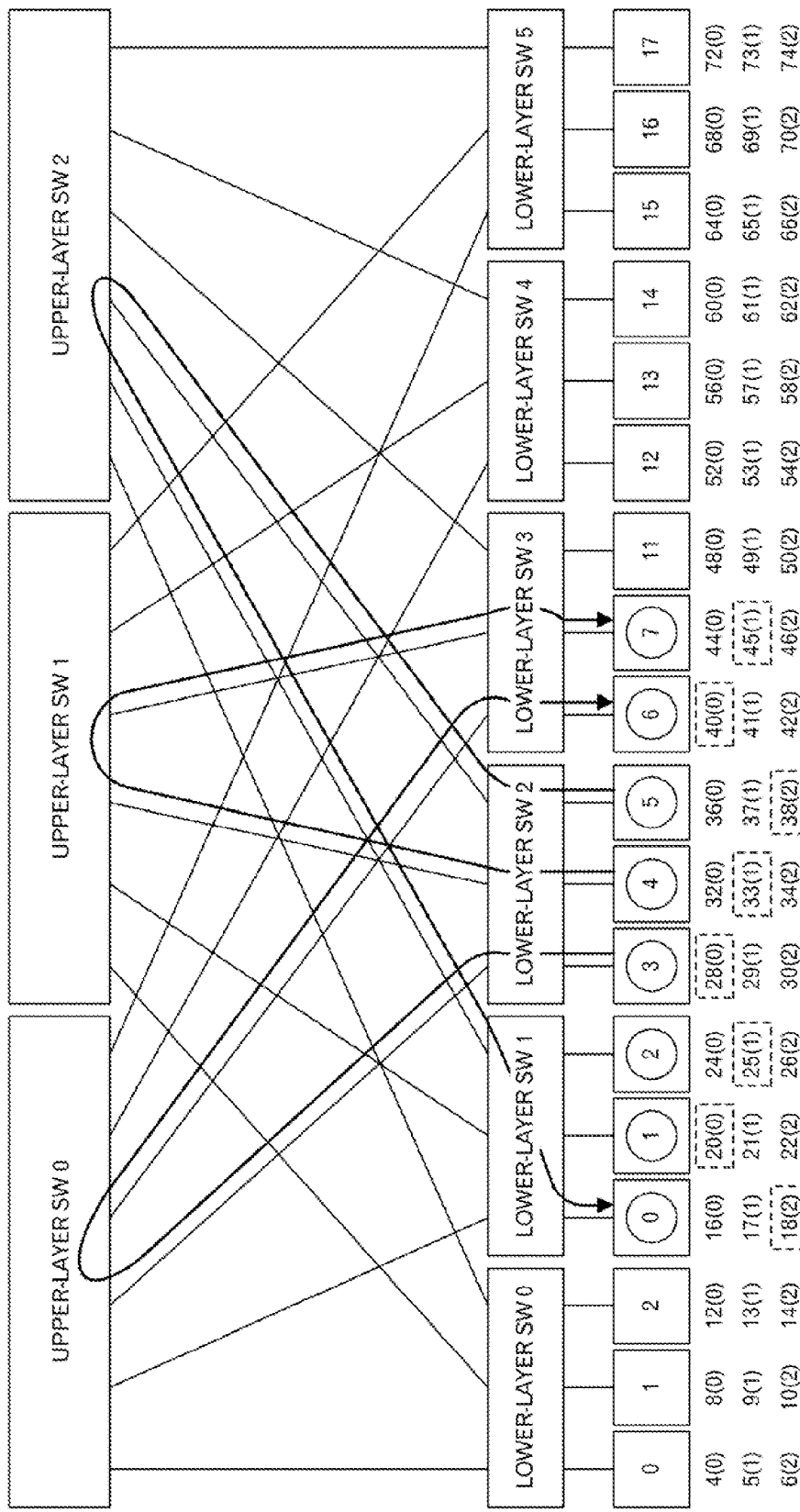
FIG. 43 is a diagram to explain an effect of the second embodiment.

For example, the same case as FIG. 7 is considered. In other words, the processes "3" to "5" transmits data to the processes "6", "7" and "0", which is determined by adding "3" to the process number (the process "0" is selected because there is no process "8".). According to this embodiment, as illustrated in FIG. 43, the communication route from the process "5" (computer comp08) to the process "0" (computer comp03) passes through the upper-layer switch "2", instead of the upper-layer switch "0". Therefore, the link conflict can be avoided.

By selecting appropriate LIDs for each communication connection generated between the invocation destination computers when the parallel program is executed, by using this embodiment, the original communication performance can be obtained when the All-to-All communication in the multi-stage multipath network is carried out. Namely, the communication time is shortened. Therefore, the entire processing time is also shortened.

Figure 44:
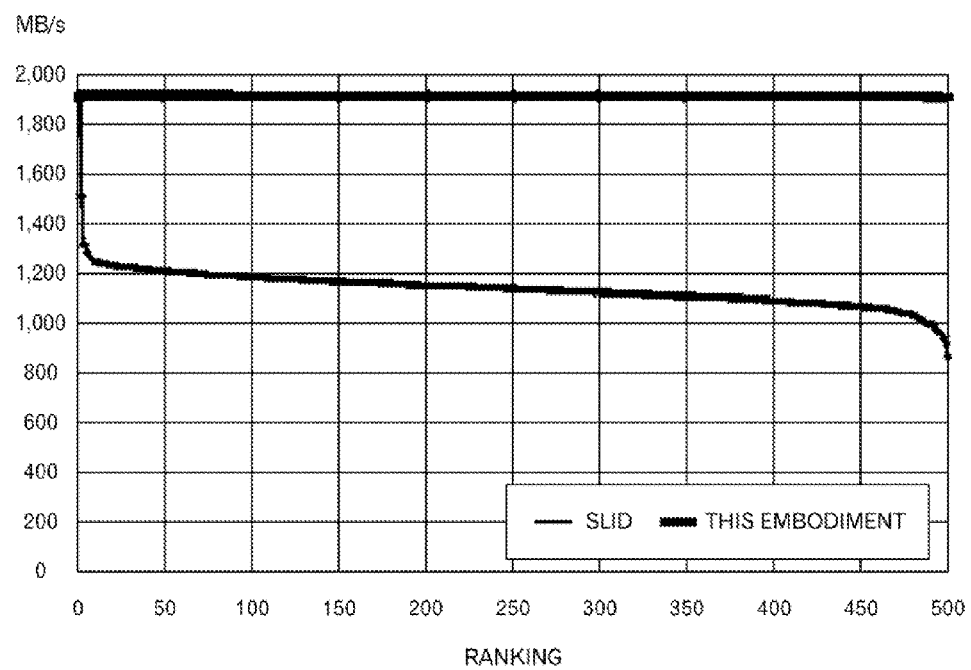
FIG. 44 is a diagram to explain an effect of the second embodiment.

For example, in an environment that the number of computers is "160", the number of upper-layer switches is "16" and the network includes two layers, an effect of this embodiment was checked by causing 64 arbitrary computers to carryout the All-to-All communication. For example, the ranking is illustrated in FIG. 44 when the substantial bandwidth was measured 500 times. In other words, the vertical axis represents the substantial bandwidth, and the horizontal axis represents the ranking. Thus, according to this embodiment, an average of the substantial bandwidth is 1915 MB/s, and the high performance can be stably obtained for all measurements. On the other hand, in the single LID allocation method (SLID), the best value of the substantial bandwidth is 1915 MB/s, the worst value of the substantial bandwidth is 871 MB/s and an average value of the substantial bandwidth 1142 MB/s. Therefore, as will be described later, the performance varies depending on the selection of the computers. On the other hand, when this embodiment is employed, the performance is improved 1.68 times in the average, and 2.20 times in the maximum when compared with the single LID allocation method.

Figure 45:
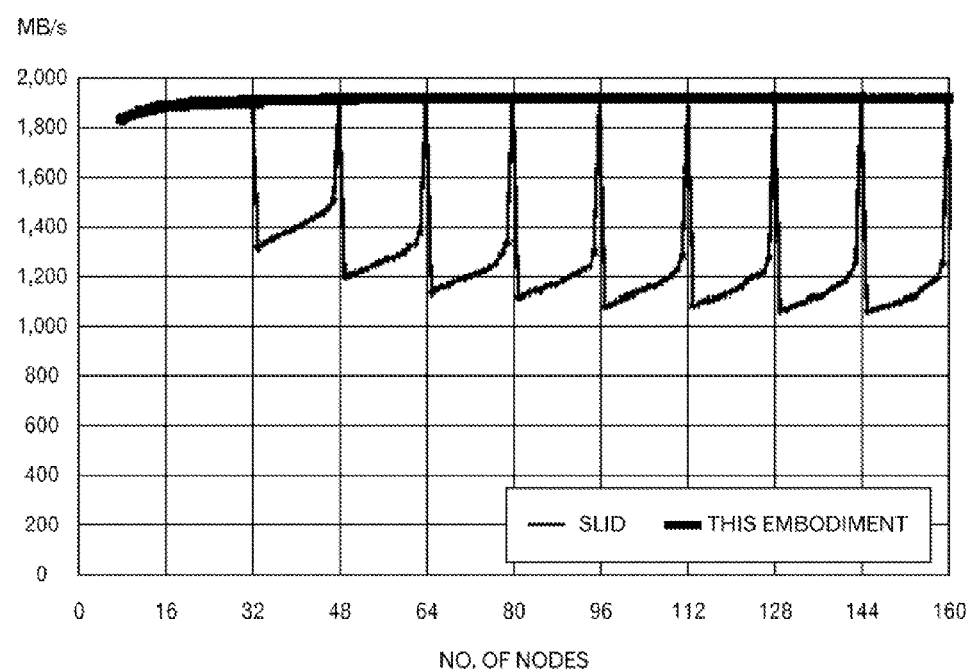
FIG. 45 is a diagram to explain an effect of the second embodiment.

In addition, FIG. 45 illustrates the substantial bandwidths when the number of nodes (i.e. the number of computers. For example, 8 consecutive computers to 160 computers.) varies. In this embodiment, the high performance can be stably obtained regardless of the number of nodes. However, in the single LID allocation method, the performance varies depending on the number of nodes. When this embodiment is employed, the performance is improved 1.79 times in the maximum, when compared with the single LID allocation method.

Thus, when this embodiment is employed, it becomes possible to stably widen the substantial bandwidth regardless of the number of invocation destination computers.

Figure 46:
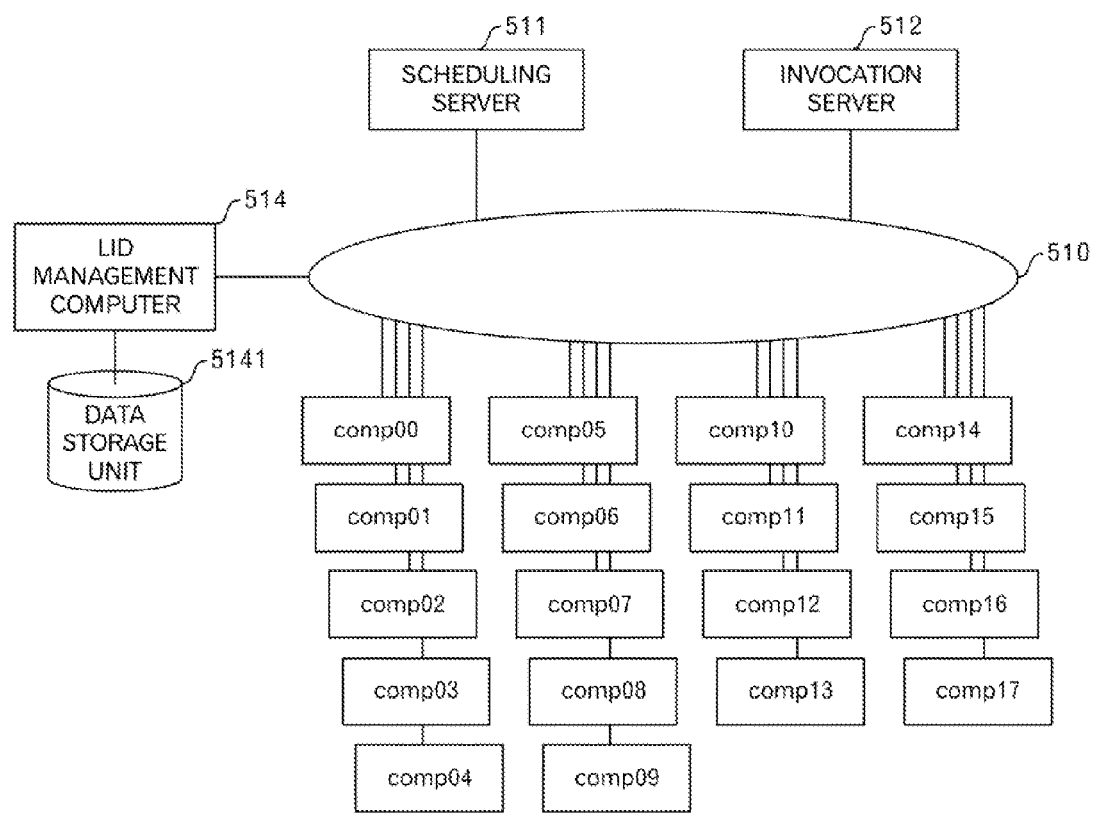
FIG. 46 is a diagram to explain an example of a system relating to a variation of a third embodiment.

Incidentally, in the aforementioned example, the initial processing unit 1121 itself corresponding to MPI_Init identifies LIDs for all of the invocation destination computers as described above. However, by employing a system as illustrated in FIG. 46, an LID management computer 514 may concentratedly identify LIDs. The LID management computer 514 may be integrated into the invocation server 512 or scheduling server 511. Furthermore, a computer on which a process whose process identifier is the minimum is invoked may operates as the LID management computer 514.

In the system illustrated in FIG. 46, the LID management computer 514 is connected to the network 510 on behalf of the shared storage 513. The LID management computer 514 has a data storage unit 5141. The data storage unit 5141 stores the LID file (FIG. 19). In addition, when the invocation server 512 notifies the LID management computer 514 of the association table, the association table may be stored in the data storage unit 5141.

Figure 47:
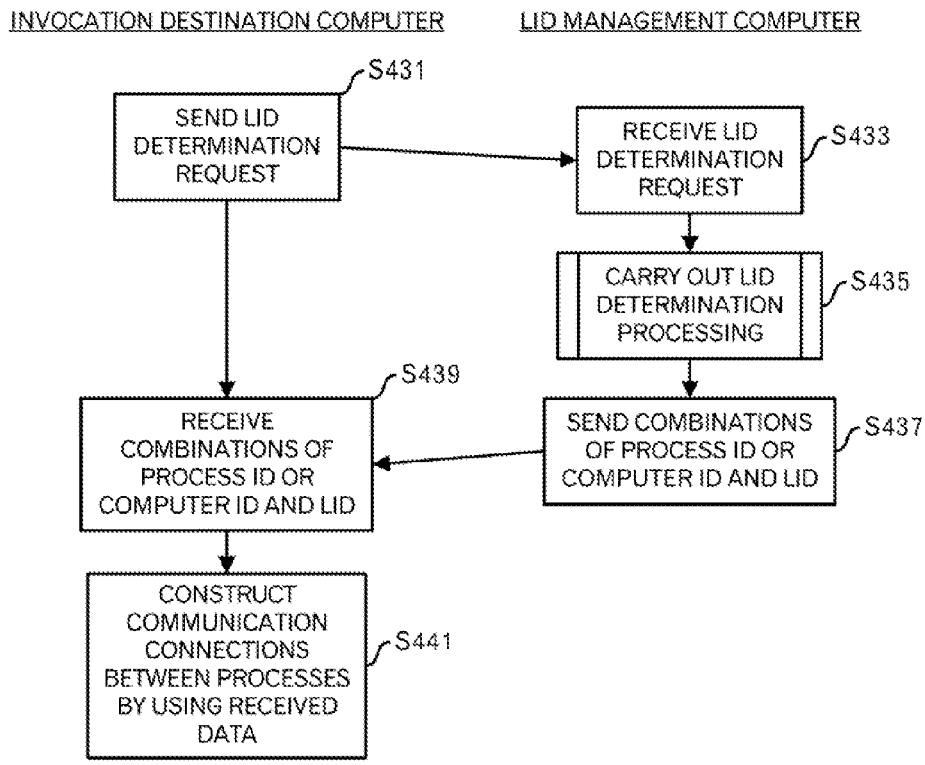
FIG. 47 is a diagram to explain an operation of the system relating to the variation of the third embodiment.

Next, an operation example when the LID management server 514 is employed will be explained using FIG. 47. After the parallel process 1110 is invoked and the initial processing unit 1121 is also invoked, the initial processing unit 1121 transmits an LID determination request to the LID management computer 514 (step S431). The LID determination request includes the association table, for example. When the association table has already been notified from the invocation server 512 to the LID management computer 514, the LID determination request includes the identification information of the association table, for example.

When the LID management computer 514 receives the LID determination request from the invocation destination computer (step S433), the LID management computer 514 carries out an LID determination processing (step S435). The LID determination processing is a processing from the step S201 to the step S215 in the processing flow of FIG. 27. Incidentally, when data of the association table is received from the invocation destination computer (also called selected computer) of the parallel process, the obtainment at the step S11 corresponds to this reception. Furthermore, at the step S215, the second association table is generated based on the transmission source of the LID determination request.

The LID management computer 514 transmits combinations of LIDs and process identifiers, computer identifiers or both of them (which correspond to the second association table or portions of the second association table), which were identified in the LID determination processing, to the requesting source computer of the LID determination request (step S437). The initial processing unit 1121 of the invocation destination computer receives data of the combinations of the LIDs and the process identifiers, computer identifiers or both of them, from the LID management computer 514, and stores the received data into the data storage area 1130, for example (step S439). Then, the initial processing unit 1121 constructs the communication connections between the invoked processes by using the received data, similarly to the step S217 of FIG. 27 (step S441).

By carrying out such a processing, the processing load of the initial processing unit 1121 is reduced.

Incidentally, the computer having a function of the invocation server 512 may carry out the processing of the step S201 to the step S215 in FIG. 27 before the process is invoked or the like, not in response to the request, and may notify the respective invocation destination computers of the processing results in addition to the second association table and the like. In such a case, the generation of the association table by the invocation server 512 corresponds to the obtainment of the association table.

Although the embodiments were explained, this technique is not limited to the embodiments. For example, the processing flow of FIG. 27 is a mere example, and as long as the processing result does not change, the order of the steps may be exchanged or they may be executed in parallel.

Figure 48:
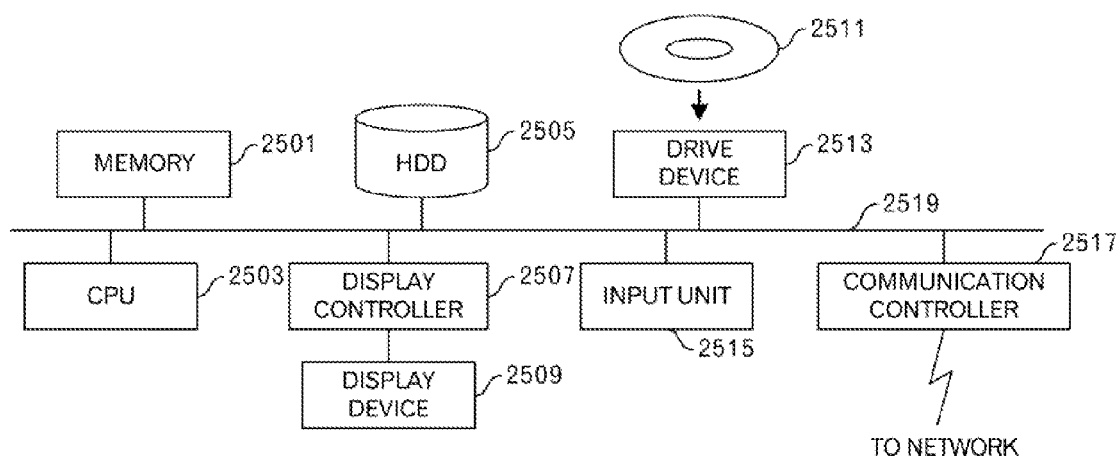
FIG. 48 is a functional block diagram of a computer.

In addition, the computers 100 and 1000, the invocation servers 12 and 512, the scheduling servers 11 and 511 and the LID management computer 514 are computer devices as shown in FIG. 48. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 48. An operating system (OS) and an application program for carrying out the foregoing processing in the embodiment, are stored in the HDD 2505, and when executed by the CPU 2503, they are readout from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The initial processing units 121 and 1121 and communication libraries 120 and 1120 including the All-to-All communication units 123 and 1123 are executed by the CPU 2503.

The embodiments described above are outlined as follows:

An information processing method relating to the embodiments includes: (A) obtaining first data including identifiers of selected computers for invocation of parallel processes among a plurality of computers connected to lowest-layer relay apparatuses in a network including relay apparatuses in a plurality of layers, wherein the network includes paths between a relay apparatus in a first layer and plural relay apparatuses in a second layer that is an immediately upper layer than the first layer; and (B) selecting, for each of the selected computers whose identifiers are included in the first data and from network identifiers for respective communication routes in the network, network identifiers to be used for communication with other selected computers so as to avoid coincidence of communication routes between the selected computers for which a same difference value (e.g. same shift distance) is calculated between identification numbers (e.g. local computer numbers), wherein the network identifiers are associated in advance with an identifier of each of the plurality of computers and are used for routing in the network, and the identification numbers are assigned for ordering the selected computers.

According to this method, the link conflict can be avoided in the All-to-All communication. Therefore, the communication performance can be enhanced.

Incidentally, the aforementioned first data may include plural associations between an identifier of the selected computer and an identifier of the parallel process. In such a case, the information processing method relating to the embodiments may further include: identifying selected computers on which the parallel processes of communication opponents are invoked, from the first data; and identifying network identifiers to be used for communication with the identified selected computers among the selected network identifiers. For example, when each of the selected computers carries out the aforementioned processing, the network identifiers to be used for the communication opponents are identified based on its own selected computer. Incidentally, in the embodiments, because the network identifies are different for each combination of the selected computers, such a processing is carried out to handle such situation.

Incidentally, the aforementioned network identifier may be provided for each of top-layer relay apparatuses included in the network.

Furthermore, the selecting may includes: determining whether or not the communication routes exist between the selected computers for which the same difference value (e.g. the same shift distance) is calculated between the identification numbers (e.g. local identification number or local computer numbers), based on second data concerning whether or not a communication route has been set, wherein the second data is managed for upward and downward directions for each path between a first relay apparatus of the lowest-layer relay apparatuses and a second relay apparatus in a layer immediately upper than a lowest layer. Thus, the coincidence of the communication routes can be correctly determined.

In addition, the aforementioned selecting may include: grouping the selected computers for each of the lowest-layer relay apparatuses; sorting groups in descending order of the number of selected computers included in the groups; and serially assigning identification numbers (e.g. local identification number or local computer number) to the selected computers based on a sorting result. According to unobvious knowledges of the inventor, it becomes easy to avoid the coincidence of the communication routes by assigning the identification numbers in this way.

Furthermore, the aforementioned selecting may include: (B1) setting an identifier of a top-layer relay apparatus, which is a remainder of an identification number of a selected computer of a transmission source for the number of top-layer relay apparatuses, into a first data structure for registering, for each combination of the selected computer of the transmission source and a selected computer of a destination among the selected computers, the identifier of the top-layer relay apparatus to be used; (B2) converting the first data structure to a second data structure for registering, for each combination of the selected computer of the transmission source and a difference value between the identification number of the selected computer of the transmission source and the identification number of the selected computer of the destination, the identifier of the top-layer relay apparatus to be used; (B3) searching the second data structure to detect coincidence of the top-layer relay apparatus through which the communication routes between the selected computers for which the same difference value is calculated between the identification numbers pass; (B4) upon detection of the coincidence of the top-layer relay apparatus, updating the second data structure so as to resolve the coincidence of the top-layer relay apparatus; converting the second data structure or the updated second data structure into a third data structure in a format of the first data structure; and (B5) converting the identifier of the top-layer relay apparatus to a network identifier associated with the selected computer of the destination in the third data structure. By carrying out this processing, it becomes possible to efficiently select an appropriate network identifier for each selected computer.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a procedure, the procedure comprises:
   obtaining first data including identifiers of selected computers for invocation of parallel processes among a plurality of computers connected to lowest-layer relay apparatuses in a network including relay apparatuses in a plurality of layers, wherein the network includes paths between a relay apparatus in a first layer and plural relay apparatuses in a second layer that is an immediately upper layer than the first layer; and
   selecting, for each of the selected computers whose identifiers are included in the first data and from network identifiers for respective communication routes in the network, network identifiers to be used for communication with other selected computers so as to avoid coincidence of communication routes between the selected computers for which a same difference value is calculated between identification numbers, wherein the network identifiers are associated in advance with an identifier of each of the plurality of computers and are used for routing in the network, and the identification numbers are assigned for ordering the selected computers.

2. The computer-readable, non-transitory storage medium as set forth in claim 1, wherein the first data includes plural associations between an identifier of the selected computer and an identifier of the parallel process, and
   the procedure further comprises:
   identifying selected computers on which the parallel processes of communication opponents are invoked, from the first data; and
   identifying network identifiers to be used for communication with the identified selected computers among the selected network identifiers.

3. The computer-readable, non-transitory storage medium as set forth in claim 1, wherein the network identifier is provided for each of top-layer relay apparatuses included in the network.

4. The computer-readable, non-transitory storage medium as set forth in claim 1, wherein the selecting comprises:
   determining whether or not the communication routes exist between the selected computers for which the same difference value is calculated between the identification numbers, based on second data concerning whether or not a communication route has been set, wherein the second data is managed for upward and downward directions for each path between a first relay apparatus of the lowest-layer relay apparatuses and a second relay apparatus in a layer immediately upper than a lowest layer.

5. The computer-readable, non-transitory storage medium as set forth in claim 1, wherein the selecting comprises:
   grouping the selected computers for each of the lowest-layer relay apparatuses;
   sorting groups in descending order of the number of selected computers included in the groups; and
   serially assigning identification numbers to the selected computers based on a sorting result.

6. The computer-readable, non-transitory storage medium as set forth in claim 3, wherein the selecting comprises:
   setting an identifier of a top-layer relay apparatus, identifier being a portion of an identification number of a selected computer of a transmission source for the number of top-layer relay apparatuses, into a first data structure for registering, for each combination of the selected computer of the transmission source and a selected computer of a destination among the selected computers, the identifier of the top-layer relay apparatus;
   converting the first data structure to a second data structure for registering, for each combination of the selected computer of the transmission source and a difference value between the identification number of the selected computer of the transmission source and the identification number of the selected computer of the destination, the identifier of the top-layer relay apparatus;
   searching the second data structure to detect coincidence of the top-layer relay apparatus through which the communication routes between the selected computers for which the same difference value is calculated between the identification numbers pass;
   upon detection of the coincidence of the top-layer relay apparatus, updating the second data structure so as to resolve the coincidence of the top-layer relay apparatus;
   converting the second data structure or the updated second data structure into a third data structure in a format of the first data structure;
   and converting the identifier of the top-layer relay apparatus to a network identifier associated with the selected computer of the destination in the third data structure.

7. An information processing method comprising:
   Obtaining, by a processing unit, first data including identifiers of selected computers for invocation of parallel processes among a plurality of computers connected to lowest-layer relay apparatuses in a network including relay apparatuses in a plurality of layers, wherein the network includes paths between a relay apparatus in a first layer and plural relay apparatuses in a second layer that is an immediately upper layer than the first layer; and
   selecting, by a processing unit, for each of the selected computers whose identifiers are included in the first data and from network identifiers for respective communication routes in the network, network identifiers to be used for communication with other selected computers so as to avoid coincidence of communication routes between the selected computers for which a same difference value is calculated between identification numbers, wherein the network identifiers are associated in advance with an identifier of each of the plurality of computers and are used for routing in the network, and the identification numbers are assigned for ordering the selected computers.

8. An information processing apparatus comprising:
   a data storage unit that stores first data including identifiers of selected computers for invocation of parallel processes among a plurality of computers connected to lowest-layer relay apparatuses in a network including relay apparatuses in a plurality of layers, wherein the network includes paths between a relay apparatus in a first layer and plural relay apparatuses in a second layer that is an immediately upper layer than the first layer; and
   a processing unit that selects, for each of the selected computers whose identifiers are included in the first data and from network identifiers for respective communication routes in the network, network identifiers to be used for communication with other selected computers so as to avoid coincidence of communication routes between the selected computers for which a same difference value is calculated between identification numbers, wherein the network identifiers are associated in advance with an identifier of each of the plurality of computers and are used for routing in the network, and the identification numbers are assigned for ordering the selected computers.

9. A communication method comprising:

controlling, by a plurality of nodes included in a communication system, to switch a state from a first state to a second state, wherein the communication system comprises first switches, second switches connected to the first switches, the plurality of nodes are connected to a plurality of switches included in the first switches, and in the communication system, different communication routes are employed according to addresses used in communication, and communication in the first state is carried out in a communication opponent relationship in which the number of nodes that exist between nodes that carry out communication is a first value when the plurality of nodes are virtually arranged in predetermined order in a ring manner, and communication in the second state is carried out in a communication opponent relationship in which the number of nodes that exist between nodes that carry out communication is a second value; and controlling, by the plurality of nodes, to switch addresses to be used in communication from the first state to the second state, wherein first addresses allocated to the plurality of nodes according to a first pattern are used to carry out communication in the first state, and second addresses allocated to the plurality of nodes according to a second pattern different from the first pattern are used to carry out communication in the second state.

10. A communication method as set forth in claim 9, wherein, when the plurality of nodes carry out communication in the first state by using the first addresses, each communication of nodes commonly connected to any one of switches included in the first switches among the plurality of nodes is distributedly routed to different switches included in the second switches, and when the plurality of nodes carry out communication in the second state by using the second addresses, each communication of nodes commonly connected to any one of switches included in the first switches among the plurality of nodes is distributedly routed to different switches included in the second switches.

* * * * *